US011193583B2

(12) United States Patent
Bradley et al.

(10) Patent No.: US 11,193,583 B2
(45) Date of Patent: Dec. 7, 2021

(54) CONTINUOUSLY VARIABLE TRANSMISSION CONTROL

(71) Applicant: Hyster-Yale Group, Inc., Fairview, OR (US)

(72) Inventors: Conor Bradley, Londonderry (GB); Robert Kee, Belfast (GB)

(73) Assignee: Hyster-Yale Group, Inc., Fairview, OR (US)

( * ) Notice: Subject to any disclaimer, the term of this patent is extended or adjusted under 35 U.S.C. 154(b) by 17 days.

(21) Appl. No.: 16/759,977

(22) PCT Filed: Nov. 7, 2018

(86) PCT No.: PCT/US2018/059565
§ 371 (c)(1),
(2) Date: Apr. 28, 2020

(87) PCT Pub. No.: WO2019/094427
PCT Pub. Date: May 16, 2019

(65) Prior Publication Data
US 2020/0278025 A1 Sep. 3, 2020

Related U.S. Application Data

(60) Provisional application No. 62/582,446, filed on Nov. 7, 2017.

(51) Int. Cl.
*F16H 61/66* (2006.01)
*B60W 10/107* (2012.01)
*F16H 61/00* (2006.01)

(52) U.S. Cl.
CPC .......... *F16H 61/66* (2013.01); *B60W 10/107* (2013.01); *B60W 2300/121* (2013.01);
(Continued)

(58) Field of Classification Search
CPC ............ F16H 61/66; F16H 2061/0012; F16H 2061/6604; F16H 2059/366;
(Continued)

(56) References Cited

U.S. PATENT DOCUMENTS

| 3,943,712 | A |   | 3/1976 | Stuhr |
| 4,102,222 | A | * | 7/1978 | Miller ................. F16H 61/0204 |
|           |   |   |        | 477/120 |

(Continued)

FOREIGN PATENT DOCUMENTS

| EP | 1156942 B1 | 7/2002 |
| GB | 2221518 A  | 7/1990 |

OTHER PUBLICATIONS

International Search Report and Written Opinion; Application No. PCT/US2018/059565; dated Feb. 27, 2019, pp. 1-12.
(Continued)

*Primary Examiner* — Justin Holmes

(57) ABSTRACT

A control system for a vehicle uses one or more inputs of a velocity request, a brake request, a speed request, travel direction indication, engine speed, and vehicle speed to determine a control strategy for a continuously variable transmission. A target engine speed is selected based upon the inputs, and the engine and continuously variable transmission ratio are controlled to achieve the target engine speed while controlling the vehicle according to the inputs. In some embodiments, the control strategy further selects the target engine speed according to accessory system demands, such as a hoist or lift system.

19 Claims, 20 Drawing Sheets

(52) U.S. Cl.
CPC ............... *B60W 2510/0638* (2013.01); *F16H 2061/0012* (2013.01); *F16H 2061/6604* (2013.01)

(58) Field of Classification Search
CPC ......... F16H 2059/704; F16H 2063/504; F16H 63/50; F16H 61/66236; F16H 59/44; F16H 61/462; F16H 61/47; B60W 10/107; B60W 2300/121; B60W 2510/0638; B60W 2710/0644; B60W 10/06; B60W 10/103; B60Y 2200/15
See application file for complete search history.

(56) References Cited

U.S. PATENT DOCUMENTS

| | | |
|---|---|---|
| 4,594,666 A | 6/1986 | Cornell |
| 4,663,713 A | 5/1987 | Cornell et al. |
| 5,540,632 A | 7/1996 | Lardy et al. |
| 5,820,513 A | 10/1998 | Greenwood |
| 5,957,990 A | 9/1999 | Graf et al. |
| 6,371,884 B1 | 4/2002 | Channing |
| 9,586,586 B1 | 3/2017 | Zhang |
| 9,589,586 B2 | 3/2017 | Zhang |
| 9,764,740 B1 | 9/2017 | Lister |
| 2015/0073671 A1* | 3/2015 | Inoue ............... B60W 30/18009 701/54 |
| 2018/0274453 A1* | 9/2018 | Livshiz ................ F16H 63/502 |

OTHER PUBLICATIONS

European Patent Office, International Search Report and Written Opinion; Application No. PCT/US2018/059565; dated Feb. 27, 2019, pp. 1-12.

European Patent Office, International Preliminary Report on Patentability; Application No. PCT/US2018/059565; dated May 22, 2020, pp. 1-7.

* cited by examiner

COMPUTER-READABLE STORAGE MEDIUM
802

PROGRAMMING INSTRUCTIONS 804
TO CAUSE A DEVICE, IN RESPONSE TO EXECUTION OF THE PROGRAMMING INSTRUCTIONS, TO PRACTICE (ASPECTS OF) EMBODIMENTS OF THE PROCESS(ES) DESCRIBED THROUGHOUT THIS DISCLOSURE.

FIG. 24

CONTINUOUSLY VARIABLE TRANSMISSION CONTROL

CROSS REFERENCE TO RELATED APPLICATIONS

This patent application is a U.S. National Phase Application under 35 U.S.C. § 371 of International Application No. PCT/US2018/059565, filed Nov. 7, 2018, entitled "CONTINUOUSLY VARIABLE TRANSMISSION CONTROL", which claims the benefit of U.S. Provisional Patent Application Ser. No. 62/582,446, filed Nov. 7, 2017, the entire contents of which are hereby incorporated by reference herein.

TECHNICAL FIELD

Disclosed embodiments relate to methods and systems for controlling vehicles with continuously variable transmissions (CVTs), and more particularly, to techniques for coordinating engine power output with CVT ratios to optimize power and efficiency.

BACKGROUND

Modern industrial equipment such as forklifts and similar machines are often used for efficient handling and moving of various goods around locations such as warehouses and yards. Such equipment may be powered by various types of power sources, including internal combustion engines (either spark or compression ignited), depending upon the intended use. Some such equipment may use the engine not only for propulsion, but also to power auxiliary systems for goods handling, such as lift mechanisms.

BRIEF DESCRIPTION OF THE DRAWINGS

FIG. 24 is a block diagram of a computer-readable storage medium that can be used to implement some of the components of the system or methods disclosed herein, according to various embodiments.

DETAILED DESCRIPTION

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Common Continuously Variable Transmission Types

Figure 1:
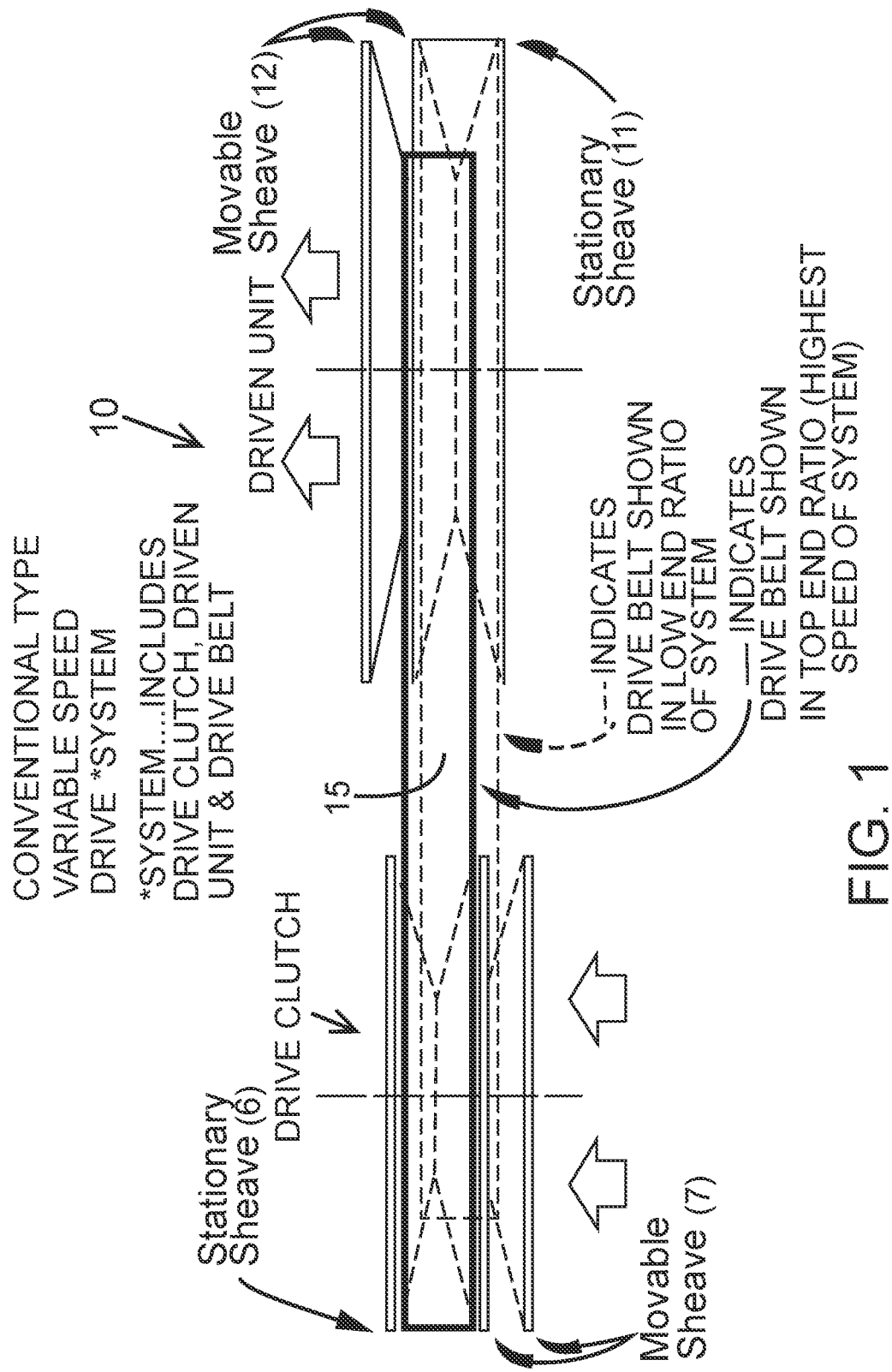
FIG. 1 illustrates a schematic diagram of a variable diameter pulley continuously variable transmission (CVT).
Figure 2:
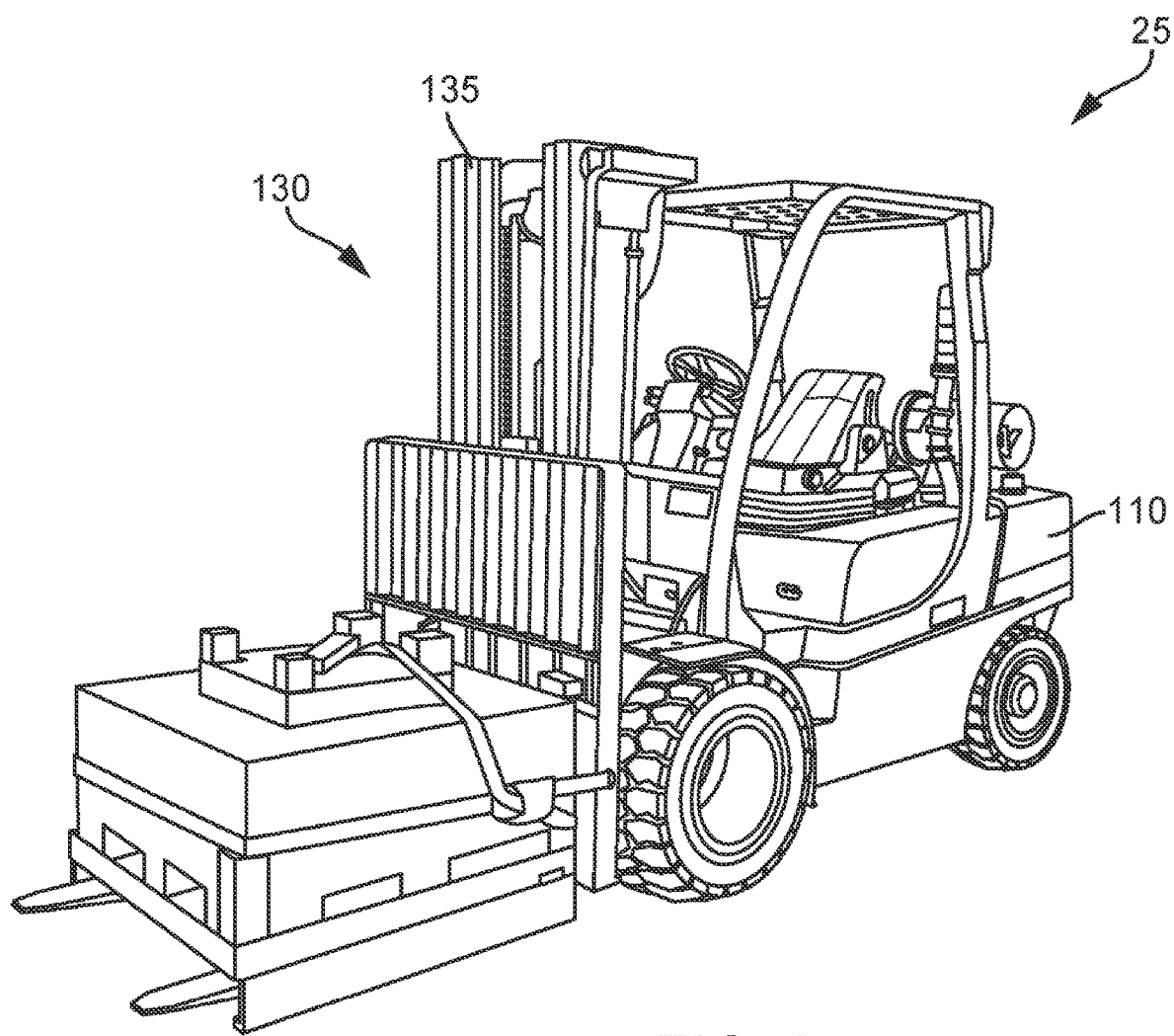
FIG. 2 illustrates a forklift equipped with a hydrostatic continuously variable transmission and a controller programmed to operate the hydrostatic continuously variable transmission, with which various embodiments disclosed herein may be employed.

FIG. 1 depicts the basic drive mechanism of an example continuously variable transmission ("CVT"), which may be used with the various embodiments disclosed herein. The depicted CVT employs one or more variable diameter pulleys, and is also known as a push belt CVT. FIG. 1 is reproduced with permission from Certified Parts Corp—all rights reserved. This design of a CVT includes two pulleys (5 and 10) that remain a fixed distance apart and are connected by either a belt (15) or a chain (not illustrated), depending on the torque and speed to be transferred. Each pulley (5 and 10) has two sheaves (6, 7 and 11, 12, respectively), one of which is free to move depending on the magnitude of an axial force applied by hydraulic pressure. The variable ratio between driver pulley 5 and driven pulley 10 is achieved by varying this axial force, thereby changing the distance between the two sheaves (6, 7 and/or 11, 12) and thus varying the effective diameter of each pulley (5 and 10). FIG. 1 shows an example of how the distance between the two sheaves (6, 7 and 11, 12) of either pulley would cause the power transmitting device, which is illustrated as a belt (15), to rise or fall in the radial direction due to the V-shape resulting from the combination of the two sheaves (6, 7 and 11, 12) that make up either pulley (5 and 10).

To maintain proper tension in the belt (15), the effective diameter of both pulleys (5 and 10) is commonly varied simultaneously. Without this simultaneous variance of pulleys 5 and 10, insufficient clamping pressure between the belt (15) and either pulley (5 or 10) may result in slippage and thus transmission power losses. Conversely, too much clamping pressure may reduce the service life of the belt (15). As such, precise control of the axial force applied to each pulley (5 and 10) helps maintain optimal operation of push belt CVTs.

Another example of a CVT is a toroidal traction drive. In a toroidal traction drive, power is transferred between input and output discs via rollers that change inclination depending on the control of the transmission ratio. It is the shearing action of a traction fluid under high pressure between the rollers and discs that allows for torque to be transferred. Because there is no metal-on-metal contact, this is known as a traction drive.

Another example of a CVT is a hydrostatic transmission ("HST"). HSTs use fluid under pressure to transfer energy between components. HSTs typically include a variable displacement hydraulic pump connected to one or more hydraulic motors, which may also have variable displacement. HSTs can vary the transmission ratio between input and output shafts by changing the volume of hydraulic fluid that is displaced by the pump for each revolution of the input shaft compared to the volume of fluid that is required by the motor to cause one revolution of the output shaft. Many HSTs may be considered as an infinitely variable transmission ("IVT") because HSTs typically incorporate a variable-displacement pump that can decrease output flow to zero, thus providing a "geared neutral" state. In certain vehicle applications, HSTs may offer advantages over other forms of CVTs such as flexible packaging and high power density.

Hydraulic pumps typically form part of a HST, and while there are several common forms of hydraulic pumps available (such as the gear and vane types), piston pumps are often employed for HSTs due to their superior pressure rating. Piston pumps are typically comprised of multiple pistons, a cylinder block, a valve plate, a swash plate to vary the piston stroke, and an input shaft. In vehicles, the input shaft of the hydrostatic pump is typically connected to a prime mover such as an internal combustion engine or an electric motor. During operation, the rotation of the input shaft causes the pistons to stroke in and out of the cylinder block, creating suction from the intake port of the valve plate and causing outflow from the discharge port of the valve plate. To produce such a flow of hydraulic fluid though the pump, the swash plate must be inclined at some angle to the axis of input shaft rotation, which is also the axis of piston rotation. Variation of the swash plate inclination angle changes the stroke of the pistons within the cylinder block and thus impacts the displacement of the pump per revolution of the input shaft. It is common to refer to the inclination angle of the swash plate simply as the 'swash' value, and it can be thought of as a coefficient where a swash value of zero, with the swashplate perpendicular to the axis of rotation, represents zero pump displacement and a swash value of one, with the swashplate at its maximum inclination from the zero position, represents the maximum pump displacement. The angle of swash plate inclination is often varied using either a hydraulic or an electric actuator operated by a controller.

Hydraulic motors used in hydrostatic transmissions are also commonly of the piston type and operate in a similar manner as the hydrostatic pump described above. However, the main difference between a hydraulic motor and a hydraulic pump is that for a hydraulic motor the flow of hydraulic fluid through the motor from the inlet port to the outlet port causes shaft rotation, which is the opposite of pump operation. The output shaft of the hydraulic motor is typically connected to the wheels of a vehicle through a gearbox, often referred to as a 'drop-box,' which adjusts the torque and speed output of the hydraulic motor to the desired operating range of the vehicle. In hydrostatic transmissions, multiple motors may be used depending on the application of the vehicle. Such motors may have fixed or variable displacement depending on the needed transmission ratio range and other factors such as cost and packaging.

Hydrostatic transmissions may incorporate other components such as a charge pump, pilot operated relief valves and a tank for the hydraulic fluid. These components are used to ensure that the transmission operates within the desired pressure range without risk of oil starvation that may occur due to system leakage.

Example embodiments are described herein with respect to a vehicle comprised of a forklift truck with a HST. However, it should be understood that the disclosed embodiments are not intended to be limited to forklift trucks, or even to industrial vehicles, nor limited to HSTs. Rather, the principles disclosed herein with respect to the described embodiments may apply to any vehicle equipped with a continuously variable transmission, and such vehicle may have, or not have, auxiliary equipment, such as hydraulically operated lifts, arms, and etc. As the mechanisms used to vary CVT input/output ratios can and do vary based upon a particular CVT implementation, the specifics of a given implementation of an embodiment described herein are likewise expected to vary without departing from the spirit of this disclosure.

System Overview

Figure 3:
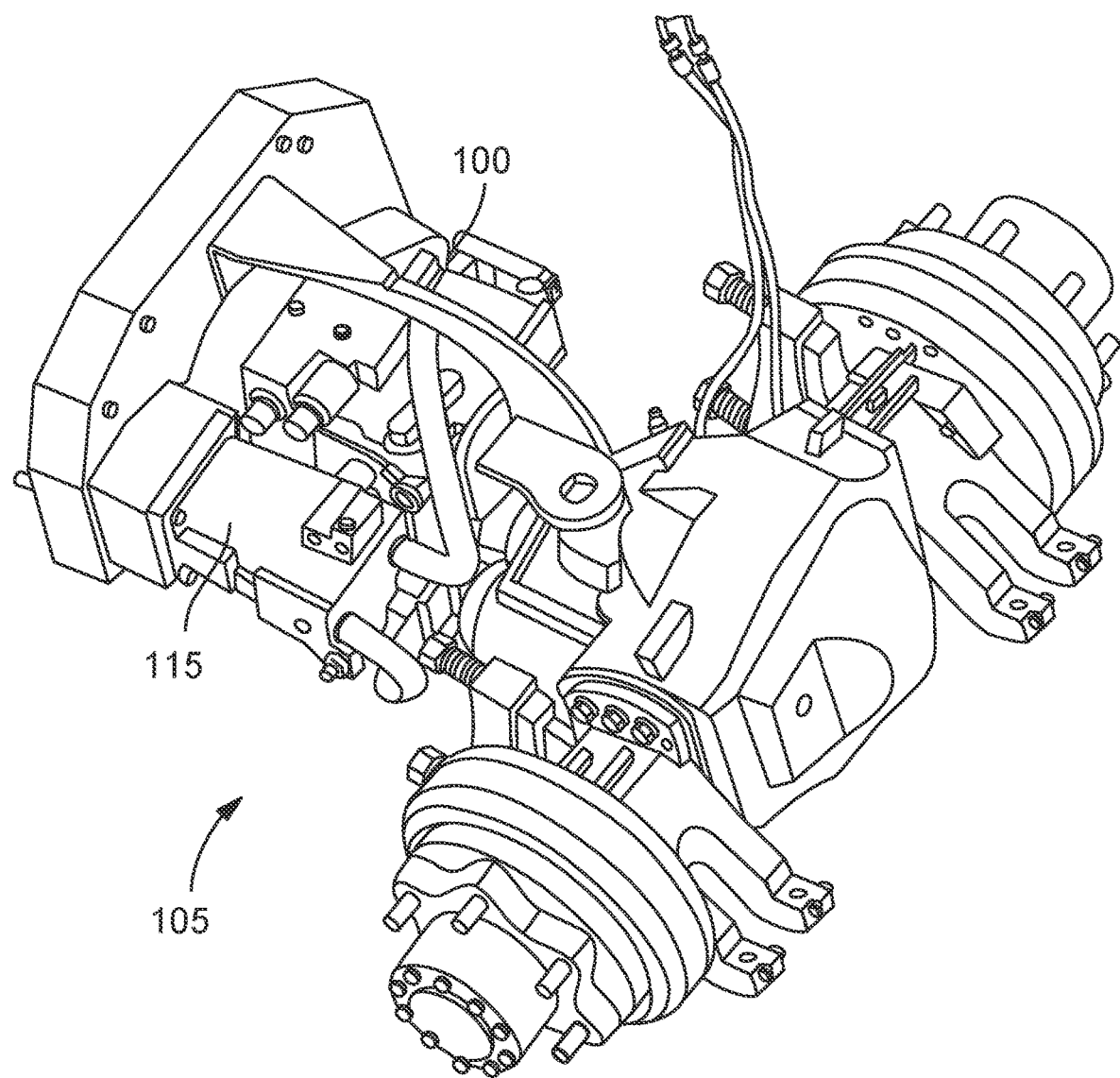
FIG. 3 illustrates a drivetrain of the forklift of FIG. 2, with which various embodiments disclosed herein may be employed.
Figure 4:
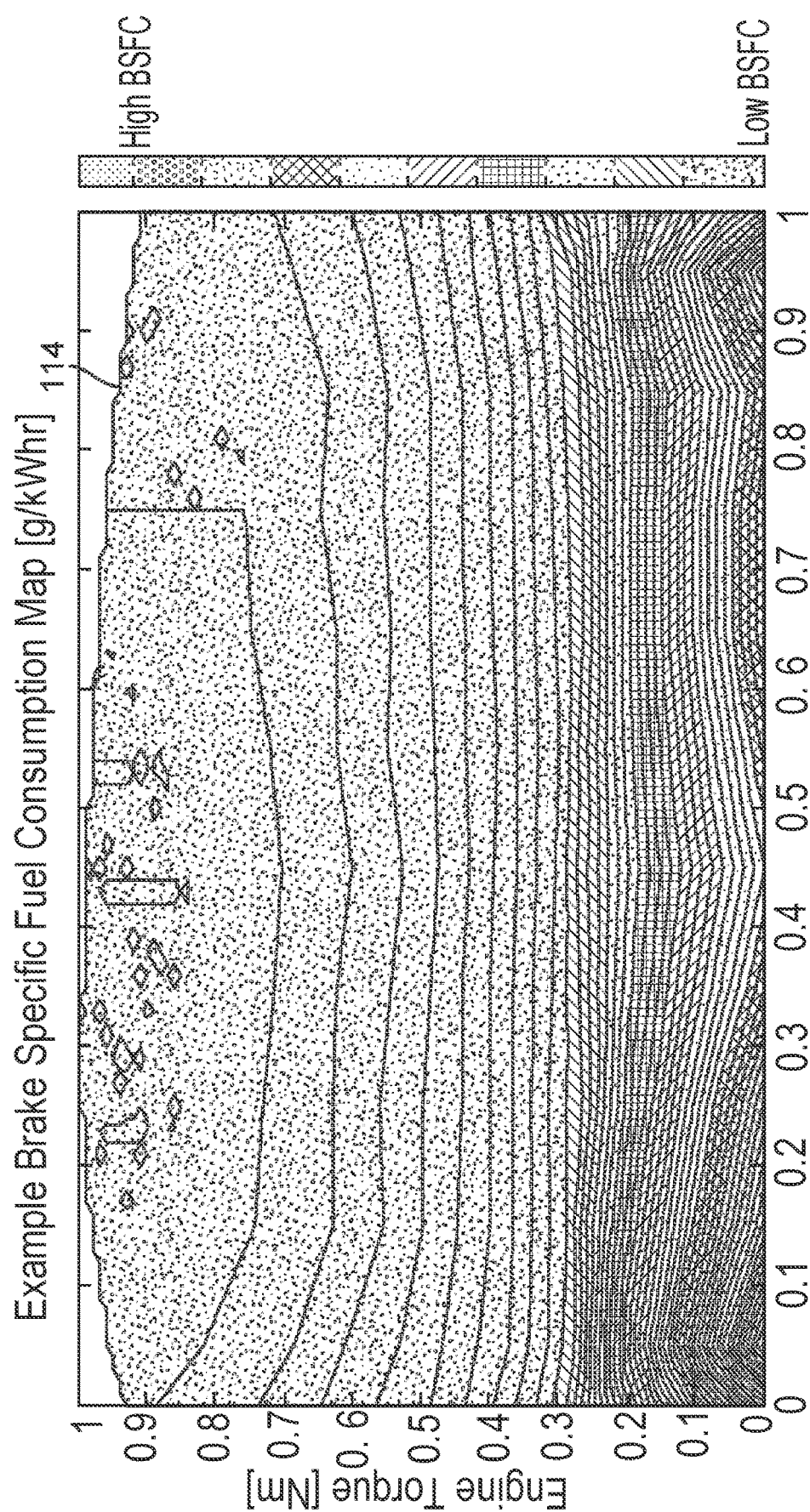
FIG. 4 illustrates an example engine speed, torque, and fuel consumption map, according to various embodiments.

With reference to the embodiment depicted in FIGS. 3 and 4, the prime-mover 100 of the drivetrain 105 in the forklift 110 is a liquid petroleum gas ("LPG") fueled 2.5 L four-cylinder internal combustion engine, manufactured by Kubota (Osaka, Japan). This particular engine 100 (designation: WG2503) is a typical four-stroke spark ignition engine and has a maximum power output of 45 kW. The engine 100 idles at a speed of 800 rpm and is rated to a maximum speed of 2700 rpm. Torque output can be varied continuously from zero to the maximum available, which ranges between 160 Nm and 175 Nm depending on the speed of the engine 100. While this engine 100 is used in the depicted embodiment, it should be understood that the engine 100 may vary in other embodiments. Other embodiments may use a compression ignition engine (e.g., a diesel) and/or may use an engine fueled by a different fuel (e.g., gasoline, fuel oil, kerosene, ethanol, etc.). Still other embodiments may use an engine with a different configuration than a reciprocating/piston engine, such as a rotary or Wankel engine, and/or may use an engine that employs a different combustion cycle, such as a two-stroke or two-cycle engine, sterling engine, or some form of external combustion, e.g. a steam engine. Any engine now known or later developed that is suitable for powering the industrial equipment for its intended purposes may be employed with the disclosed embodiments.

For the engine 100 of the forklift 110, FIG. 4 illustrates the relationship between the engine speed and the maximum torque output available at that speed, indicated by the thick black line 114. Also indicated on FIG. 4 are regions of engine torque and speed where the fuel consumption, measured in specific units of g/kWh, lies within a given range. From the plot illustrated in FIG. 4, it may be seen that specific fuel consumption of the engine 100 decreases significantly with increasing output torque for a given engine speed. Further, increasing engine speed at a given torque output has a less significant influence on the fuel consumed. For optimal efficiency at a given power output, it is better to minimize the rotational speed of the engine 100 and maximize its torque output. Such an optimization strategy may apply to a variety of engines, including some of the various types listed above. Other engine types may have optimal efficiency points where the rotational speed of engine 100 is targeted at a particular point in the engine 100's power band, such a mid-point; embodiments using such engine types may target maximizing torque output around this mid-point, rather than seeking to minimize rotational speed. Still other engine types may offer a range of optimal torque and rotational speed combinations, and embodiments may adopt a control strategy, as will be discussed herein, that targets a combination of torque and rotational speed within this optimal range.

In embodiments, gear ratios may be defined by the speed of the output shaft of the HST 115 divided by the speed of the input shaft of the HST 115. Thus, for a given road speed and/or load, an increase in transmission ratio will reduce engine speed and subsequently increase the required engine torque, and vice versa. It will be understood that this relationship holds true where other types of CVT (other than an HST) are employed.

The forklift 110, in the depicted embodiment, includes a HST 115 that has an A4VG variable displacement piston pump (not illustrated) and an A6VM variable displacement piston motor (not illustrated), both manufactured by BOSCH Rexroth (Lohr am Main, Germany). The displacement of the pump and the motor is changed by electronic actuators that are controlled by a control system 120 (FIG. 5) such that an infinitely variable transmission ratio can be delivered between the HST input and output shafts. Other embodiments may use different types/models of HST 115; different models may utilize different types of pumps (e.g. turbine or vane), and/or may use different mechanisms to change pump displacement or flow.

Figure 6:
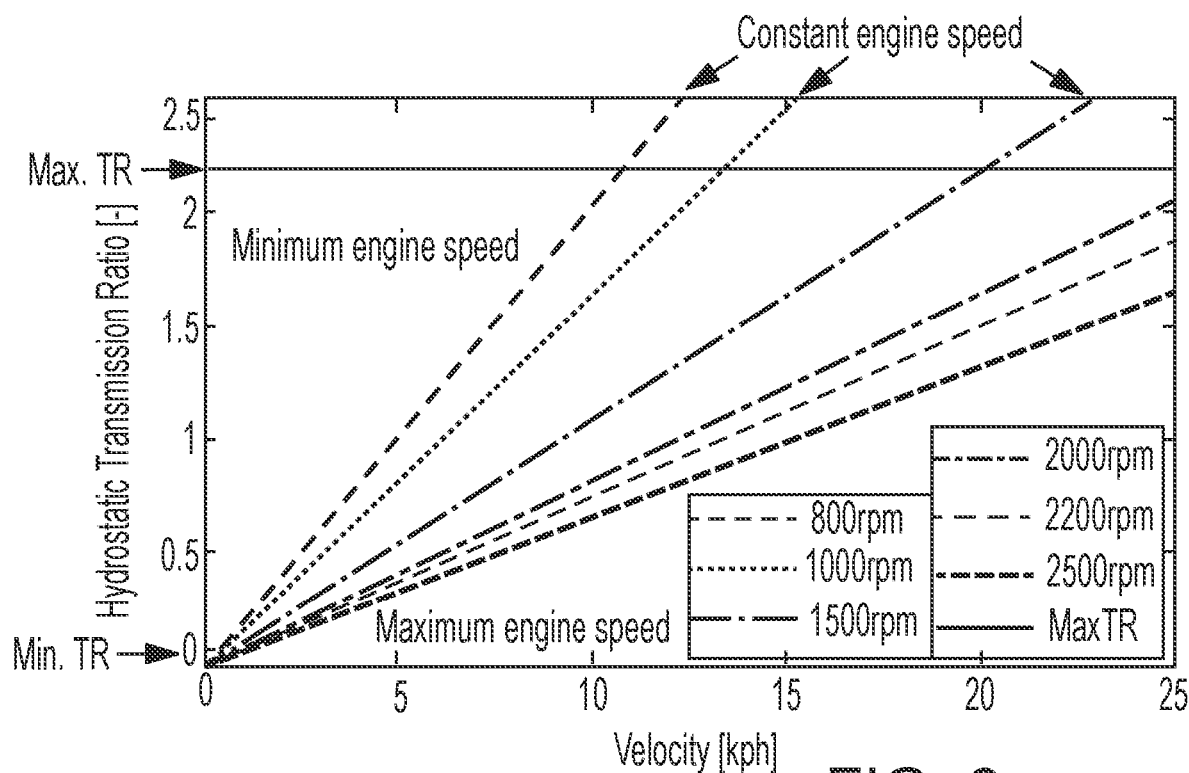
FIG. 6 illustrates an example vehicle velocity, transmission ratio, and engine speed map, usable for various embodiments.

In the disclosed embodiments, any value of transmission ratio between zero and the maximum HST 115 is capable of can be delivered, regardless of other variables such as vehicle velocity or engine speed. Because the engine 100 operates between its limits of minimum and maximum engine speed, there is a wide combination of possible engine speed and transmission ratio values that can be used to attain a desired vehicle velocity. The relationship between vehicle velocity and the ratio of the HST 115 is illustrated in FIG. 6 for a selection of different engine speeds. It will be appreciated by a person skilled in the relevant art that HST 115 may instead be implemented using another type of CVT (including an IVT), which may be equipped to forklift 110. For ease of explanation, an HST 115 will be described in the ensuing embodiments, but it should be understood that any other suitable type of CVT may be used in lieu of HST 115.

In embodiments, engine 100 and HST 115 may be controlled independently of each other by the control system 120, such as with vehicle systems manager 140 controlling HST 115, and providing feedback to ECU 125 (described herein), which is separately responsible for control of engine 100. HST 115 control may be configured to avoid stalling the engine 100 or damaging the drivetrain 105 by over-speeding the engine 100. For example, if the forklift 110 is traveling at a velocity of 5 kph with a HST 115 ratio of 0.55, the engine 100 is rotating at a speed of 1500 rpm. If the transmission ratio is increased to a value of 1, the engine speed will drop to a value of 800 rpm and the forklift 110 will continue to travel at 5 kph, provided that sufficient torque is available from the engine 100. However, if the transmission ratio is increased further, the engine 100 will be forced to rotate at a speed that is less than the idle value of 800 rpm and the engine 100 may not be able to deliver sufficient torque to maintain vehicle motion and so the engine 100 may stall.

Similarly, if the forklift 110 is traveling at a velocity of 5 kph and the hydrostatic transmission ratio is decreased continually from the original value of 0.55, the engine speed will increase until such point that the engine speed has surpassed its maximum rated value of 2700 rpm, potentially resulting in damage to or failure of engine 100.

Additionally, if the forklift 110 is brought to a standstill from 5 kph by application of the friction brakes (not illustrated) the transmission ratio must be reduced from its initial value of 0.55 as the forklift 110 decelerates, if HST 115 or another component of the drivetrain between engine 100 and HST 115 is not equipped with a clutch to disengage or otherwise allow engine 100 to rotate at a higher speed. Otherwise, the engine 100 will stall when it is forced to rotate at a speed which is less than the idle value of 800 rpm.

Figure 7:
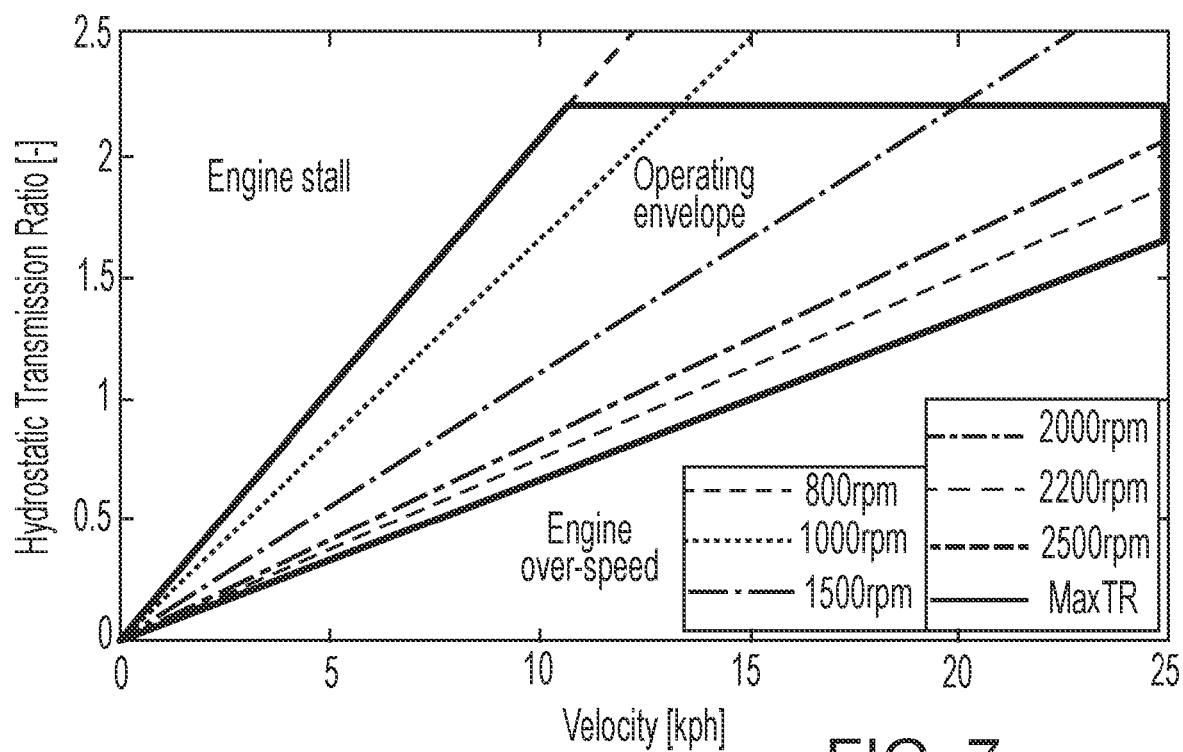
FIG. 7 illustrates the map of FIG. 6 with engine zones indicated, usable for various embodiments.

The above examples illustrate that the transmission ratio, in various embodiments, should be controlled carefully while the forklift 110 is in operation so the engine 100 does not operate in undesirable conditions. Additionally, the engine control unit 125 (FIG. 5) that may constitute a part of the control system 120 should receive the correct value of desired engine speed relative to the transmission ratio commands such that the engine controller 125 will adjust the torque output to maintain vehicle motion. FIG. 7 illustrates how these restrictions define an 'operating envelope' inside of which the forklift 110 should be kept. In embodiments, control system 120 is configured to coordinate inputs to engine controller 125 with transmission ratio commands.

The forklift 110 may include a hoist system 130 to operate the mast 135 in lifting and tilting operations. The hoist system 130, in embodiments, comprises a variable displacement hoist pump, multiple hydraulic cylinders, and various solenoids and valves. The common elements between the hoist system 130 and the drivetrain 105 are the engine 100, which is geared to drive the hoist pump via a chain and sprockets, and the hydraulic tank (not illustrated).

The control strategy of the hoist system 130, as may be implemented by control system 120, relates the magnitude of the driver's lever inputs to a desired flow rate that is required from the hoist pump. This flow rate in turn defines a minimum speed at which the engine 100 must be rotating for the hoist pump to deliver the required flow rate when it is operating at its maximum displacement. When the engine speed requested from the hoist system 130 is lower than that required by the drivetrain 105 for forklift 110 travel, the hoist pump will operate at reduced displacement to achieve the desired flow rate.

However, in cases where the engine speed requested from the hoist system 130 is greater than that required by the drivetrain 105, the control system optionally delivers the higher value of engine speed requested by the hoist system 130 without adverse influences on forklift 110 velocity through control of the transmission ratio as discussed below. See the Hoisting Overrides section below for further details.

The forklift 110 in the depicted example also uses a hydraulically assisted steering system. This steering system also requires hydraulic flow from the hoist pump, but it does not place additional significant demands on the engine 100 for rotational speed. Nevertheless, both the steering and hoist systems may place significant loads on the engine 100 via the hoist pump and that, optionally, the operation of these systems takes priority over vehicle travel. Consequently, the transmission control strategy optionally allows for the fact that the engine 100 may not always have sufficient torque available to accelerate the forklift 110 at the rate requested by the driver. Thus, the control system is designed, in embodiments, to be flexible enough to manage the demands from the driver and prevent the engine 100 from stalling.

Controller

For the embodiment described with respect to FIGS. 3, 4, 6, and 11-23, the control system 120 constitutes two components, engine control unit ("ECU") 125, which may be supplied with engine 100 or otherwise provided by the engine's manufacturer, and a vehicle systems manager 140 that communicates with the ECU 125. For the depicted embodiment, the ECU 125 is capable of accepting engine speed requests, but is not capable of receiving engine torque demand. As such, the relationship between engine torque output and the difference between the desired and actual engine speed is considered to be unknown. For some embodiments, it is desirable to use a controller with a speed control setting for simplicity with controlling the engine for both traction and auxiliary functions, such as commanding a hoist speed for a forklift. In other embodiments, the controller may be a single component with a single processor, a single component with multiple processors, or other suitable controller arrangement, and may be capable of receiving both engine speed requests and engine torque demands and controlling an engine to meet such engine speed requests and engine torque demands. In still other embodiments, ECU 125 may be capable of receiving engine torque demands in addition to, or in lieu of, engine speed requests. In such embodiments control system 120 may specify a particular torque to be provided, and coordinate transmission ratios to achieve a desired target transmission output speed, which in turn may translate to a desired vehicle velocity.

Although ECU 125 and vehicle systems manager 140 are depicted as two discrete components that comprise control system 120, this depiction is for illustration only. Various embodiments may integrate ECU 125 and vehicle systems manager 140 into a single integrated unit. Other embodiments may have multiple modules that each perform different aspects of ECU 125 and/or vehicle systems manager 140, while achieving all necessary functionality for control system 120.

In the depicted embodiment, the engine 100 is controlled electronically via ECU 125, which is manufactured by EControls (San Antonio, USA) and either supplied by engine 100's manufacturer or otherwise recommended by the manufacturer. ECU 125 accepts requests for engine rotational speed and varies the engine 100 output torque accordingly in an attempt to meet requests for engine rotational speed. As such, the output torque of the engine 100 is a variable which cannot be controlled directly by the vehicle systems manager 140, because only a desired engine speed may be requested from the ECU 125. For some embodiments, the ECU 125 may be a closed controller (e.g. the specifics of its implementation and any associated code or software are not publicly available) because of confidentiality issues and constraints regarding emissions compliance. The internal working of the ECU 125 may be relatively unknown for some embodiments. Thus, it may not be possible to change the ECU 125 or tune its response for some embodiments. However, the ECU 125 can generally be viewed as analogous to a PID controller with variable gain values. Embodiments disclosed herein assume that the workings of ECU 125 are unknown, and thus unnecessary to the disclosed control strategies. It should be understood that, where the operation of ECU 125 can be better known, vehicle systems manager 140 may be configured to take advantage of these workings and/or additional inputs, while still adhering to the disclosed control strategies.

ECU 125 may receive requests for engine rotational speed from a CAN bus network (not illustrated) with which vehicle systems manager 140 is also connected, via a direct link between vehicle systems manager 140 and ECU 125, or by some other suitable communications link. Such communications link may be hard-wired, or may be wireless, e.g. using Bluetooth, Zigbee, WiFi, or some other suitable wireless protocol; the protocol may be standards-based or proprietary. In some controller embodiments, such as control system 120, available feedback signals may be limited when integrated into existing vehicle architectures. For example, for forklift 110 the available feedback signals are from speed sensors such as an engine speed sensor and a transmission output shaft speed sensor. Thus, it may not be desirable to use additional sensors, such as pressure and torque transducers, to influence the control strategy because of the additional cost of such sensors and added processing complexity.

Vehicle systems manager 140, in embodiments and as suggested by the name, may control various vehicle systems (possibly apart from engine 100, which may be controlled by ECU 125 as described above), including HST 115/drivetrain 105, and any accessory systems such as a lift or hoist. Vehicle systems manager 140 may implement a portion or all of the control strategies described herein. In some embodiments, the functionality of ECU 125 may be integrated into vehicle systems manager 140. Vehicle systems manager 140 may be implemented in whole or in part with or as a computer device 500, as described below. Embodiments may use discrete circuitry or components, custom-designed processors, such as with ASICs, FPGAs, and/or custom-developed silicon, or a combination of the foregoing, to implement some or all functional modules, units, or other functional aspects of vehicle systems manager 140. Other embodiments may use a general purpose computer, such as computer device 500 or aspects thereof, in combination with instructions on a computer-readable medium, such as programming instructions 804 contained on a computer-readable storage medium 802 described below with respect to FIG. 24, to implement some or all functionality of vehicle systems manager 140. In still other embodiments, vehicle systems manager 140 may be implemented across multiple physical modules, each with specific control functionality.

Control Architecture

Figure 5:
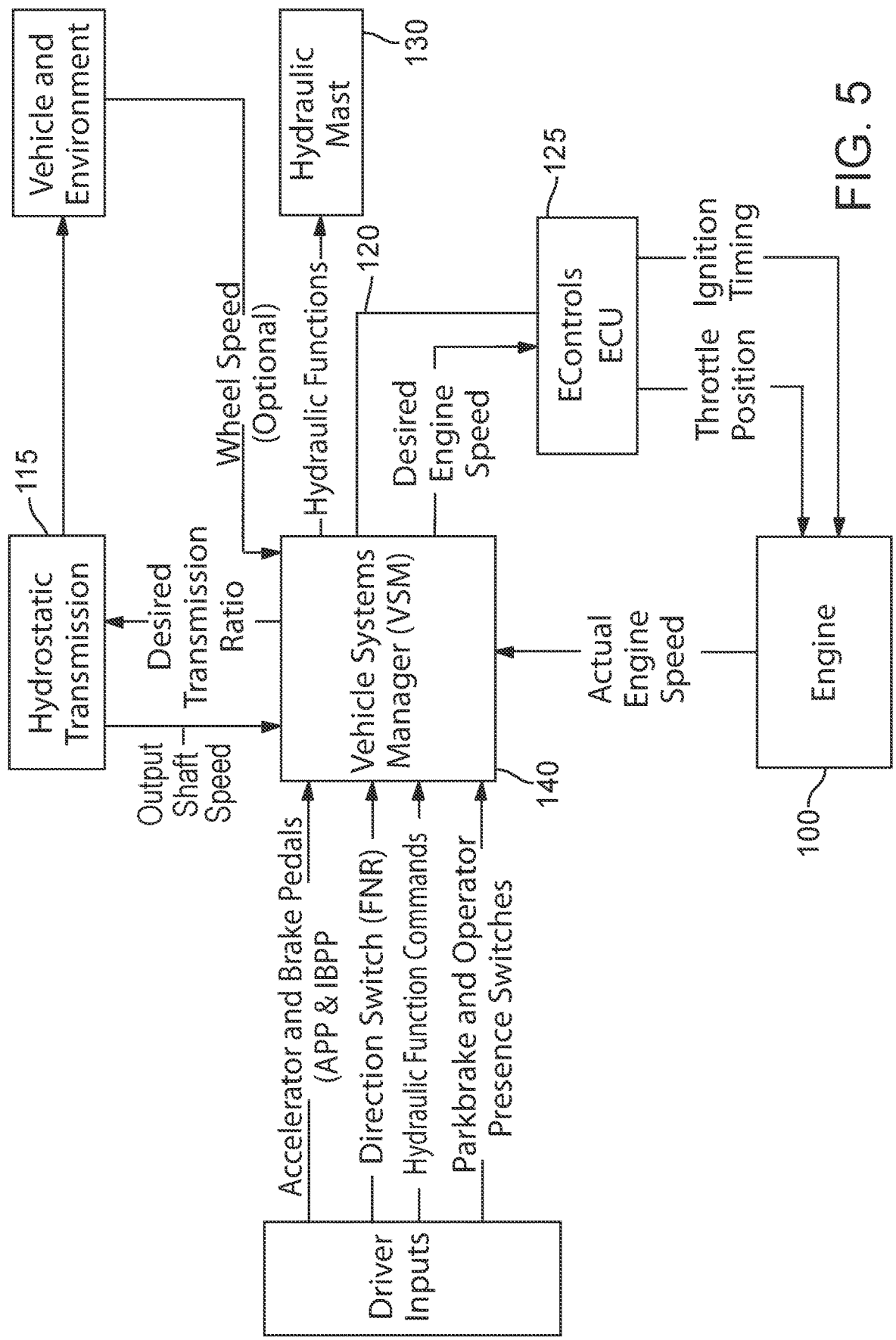
FIG. 5 illustrates a schematic diagram of possible system components of the forklift of FIG. 2 with controller components, according to various embodiments.

FIG. 5 illustrates an example vehicle control system 120 communicating with various systems, including the vehicle drivetrain 105. In the depicted example, the driver can modulate the inputs to the vehicle control system electronically via several manual operations. For example, the magnitude of accelerator and brake pedal displacement govern the request for vehicle speed that is received by the controller. Travel direction is set as forward, neutral, or reverse, for example, via a switch on the steering column, and a signal indicating the selected travel direction is sent to the vehicle systems manager 140. Additionally, the brake pedal is hydraulically connected to the friction brakes of the truck. A request for hydraulic functions, such as mast lift or tilt, are set by lever positions that the driver can adjust through hand controls.

In the depicted embodiments, the feedback signals to the control system 120 include the transmission output shaft speed from a speed sensor located on the HST 115, which is used by the vehicle systems manager 140 to calculate the actual vehicle speed, and the actual engine speed which is sent from the ECU 125 to the vehicle systems manager 140.

Based on signals indicating accelerator pedal position, brake pedal position, travel direction, actual vehicle speed, and actual engine speed, the control system 120 establishes the magnitude of the desired engine speed, which is sent to the engine 100 via the ECU 125, and the commanded value of transmission ratio, which is controlled electronically by solenoids that vary pump and motor displacement in relation to the applied current.

The hydraulic functions of lift and tilt are embedded inside the vehicle systems manager 140. The hoist system 130 sets various solenoid positions inside the main valve block which in turn governs the hydraulic flow sent to each element of the system. The influence that the hoist system 130 has on the vehicle drive system is the magnitude of the desired engine speed, which may be higher than that requested by the drive controller due to the requirement for a high flow rate from the hydraulic hoist pump. In this case, the magnitude of the desired engine speed is overwritten by the hoist system 130 and thus the magnitude of the transmission ratio requested by the drive controller is adjusted downward accordingly.

Terminology

As used in this application, the term "steady-state" refers to an operation where the vehicle drivetrain 105 is in equilibrium and therefore the forklift 110 maintains a constant velocity. In cases where the driver's input is constant, the drivetrain 105 may not be in equilibrium and the forklift 110 could be accelerating or decelerating. This is referred to as "quasi-static" operation.

In addition, in various embodiments, the driver's main interaction with the behavior of the forklift 110 is via the accelerator pedal position ("APP"). The APP is interpreted as a demanded engine power, which is supplied to drive wheels on forklift 110 through the HST 115 and, in some implementations, a final drive ratio that may be supplied by a differential or similar fixed-ratio gearbox mechanically coupled to the drive wheels.

Engine Operation

Figure 8:
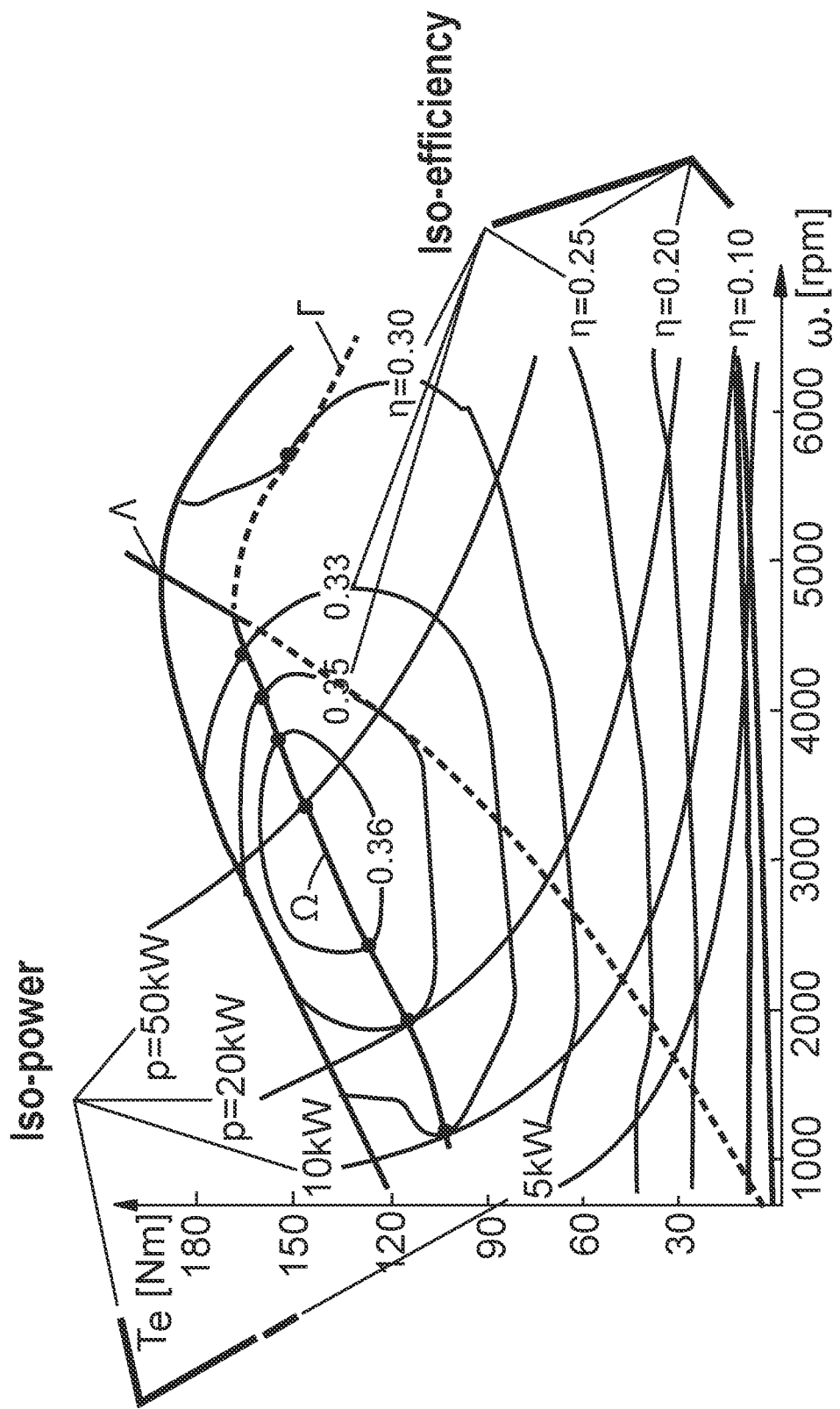
FIG. 8 illustrates an engine rpm and torque map with iso-power curves and iso-efficiency curves, usable for various embodiments.

Internal combustion engines are characterized by their thermal efficiency, i.e., their ability to convert the chemical energy stored in fuel into a useful work output. To highlight this fact, an example efficiency map for a typical spark ignition engine is shown in FIG. 8. Iso-efficiency curves (thin black lines) denote regions of engine torque and speed where the efficiency lies within a given range. Also plotted in FIG. 8 are iso-power curves (thin grey lines). The power output of the example engine is constant at any point along an iso-power curve.

For any given power output of a typical engine 100, there is a corresponding point of speed and torque that results in the best possible thermal efficiency. This relationship allows the creation of a quasi-static peak efficiency curve, which is denoted by $\Omega$ in FIG. 8. The quasi-static peak efficiency curve $\Omega$ represents a sequence of intersections between iso-power curves and iso-efficiency curves. To maintain the engine operation on the quasi-static peak efficiency curve $\Omega$, the engine speed and torque are both controlled simultaneously in various embodiments.

Steady State Operation

A goal for steady-state CVT operation would be to operate the engine along the quasi-static peak efficiency curve $\Omega$ to satisfy any given power demand at the wheels. However, the characteristics of the drivetrain 105 may impose restrictions on maintaining engine operation on the quasi-static peak efficiency curve $\Omega$.

For example, the maximum transmission ratio driving resistance curve Λ, also plotted on FIG. 8, restricts the ability to maintain engine operation on the quasi-static peak efficiency curve Ω. Assuming a lossless drivetrain 105 for explanation purposes, the maximum transmission ratio driving resistance curve Λ represents how a given power at the wheels is satisfied by a specific combination of engine speed and torque when using the maximum available transmission ratio. The maximum transmission ratio driving resistance curve Λ also defines the best possible engine efficiency that is attainable during steady-state travel.

For example, consider the iso-power curve of 10 kW, which intersects the iso-efficiency curve of 0.33, thus indicating that a theoretical maximum efficiency of 33% is possible. In reality however, the restriction of the maximum transmission ratio driving resistance curve Λ means that the best possible efficiency while operating in steady-state at 10 kW is approximately 27% as indicated by the intersection of the 10 kW iso-power curve with the maximum transmission ratio driving resistance curve Λ between the 0.25 and 0.30 iso-efficiency curves.

Therefore, for high steady-state power values a better efficiency than using the maximum transmission ratio may be attained. For a high power value, Ω is below Λ and the engine can be operated at its maximum efficiency. The culmination of these points result in the peak efficiency curve for steady-state operation Γ (dashed black and grey together). Thus, a goal for some embodiments for steady-state operation is to maintain the engine operation on the peak efficiency curve for steady-state operation Γ.

Deceleration Control

In embodiments that employ a HST, it is typically not possible to reduce pump swash to zero and utilize hydrostatic braking without first transitioning through regions of decreasing pump displacement, reducing the transmission ratio and thus increasing the engine speed. Balancing engine braking torque with the load transferred from the transmission to the engine as transmission ratio changes can help prevent the engine from over-speeding, which could potentially cause permanent damage to the drivetrain 105. Such balancing may be implemented using a control strategy to control the HST 115 such that the braking capacity of the forklift 110 can be utilized during deceleration before the application of friction brakes occurs.

Insights

Embodiments of a control system for a vehicle equipped with a CVT may include a number of different aspects. For example, different engine speed and transmission ratio control strategies can account for situations where hydraulic implements, such as lift and tilt cylinders, need a higher engine speed than that requested by the drivetrain 105. Also, various strategies can enable a vehicle to cope with different conditions of loading or road gradient without input from the operator. Still further, control strategies may help prevent the engine from stalling when the vehicle is decelerated or when more power is demanded than is available. Selectable operating modes can allow the truck to satisfy the driver's desire for productivity with respect to fuel efficiency.

Control System Desires

The vehicle control system may respond to the inputs of a driver in a predictable manner such that the vehicle remains both controllable and effective. For example, a vehicle control system may need to cope with varying external factors such as vehicle loading or road gradient without input from the operator, prevent the engine from stalling by managing power demands, optimize the efficiency of the drivetrain by accounting for the characteristics of the engine and CVT, provide for auxiliary tasks such as hoisting or tilting while the vehicle is in motion, and be able to perform fine control tasks such as inching forward or controlled roll-backs without being too sensitive to larger inputs from the driver.

Driver Control Inputs

In the depicted embodiments, the driver of forklift 110 has three main inputs that influence control of the drivetrain 105 with respect to vehicle travel. Particularly, the accelerator pedal position, APP (0-100%), inch brake pedal position, IBPP (0-100%), and the forward-neutral-reverse switch, FNR (+1,0,−1). Other embodiments may use additional, fewer, or different sets of inputs, or may use different input ranges, along with a reconfiguration of control system 120 itself to properly utilize a given set of inputs.

These three inputs are interpreted by the control system 120 to set the value of the desired vehicle velocity as well as the available engine power for acceleration as discussed in more detail below. For vehicles equipped with auxiliary equipment, such as a lift mast, bucket arm, or other suitable equipment, the driver controls the hydraulic functions via hand controls that may influence the control of engine speed, as discussed above. These additional controls may constitute further sets of inputs into control system 120.

Control Outputs

In embodiments, the outputs from the vehicle systems manager 140 include the desired engine speed, which is sent to the ECU 125 via the CAN bus network (not illustrated) and the commanded value of transmission ratio. In embodiments that do not employ an ECU 125, the desired engine speed may be directly commanded via vehicle systems manager 140, such as by varying a signal sent to a solenoid or servo attached to the engine's throttle mechanism. In embodiments employing a HST, the value of the transmission ratio is delivered by varying the volumetric displacements of the pump and motor. This may be achieved by the control system 120 modulating the current sent to the displacement control solenoids. For embodiments that employ other types of CVT, such as a variables pulleys connected via a belt or chain, the commanded transmission ratio value is delivered by adjusting the pulley sheaves to vary the effective radii of the driving and driven pulleys. As with the HST, this may be accomplished by control system 120 modulating current sent to control solenoids that move the adjustable pulley sheaves. Other types of CVT may vary the commanded ratio value using other methods specific to the particular type of CVT employed.

Figure 9:
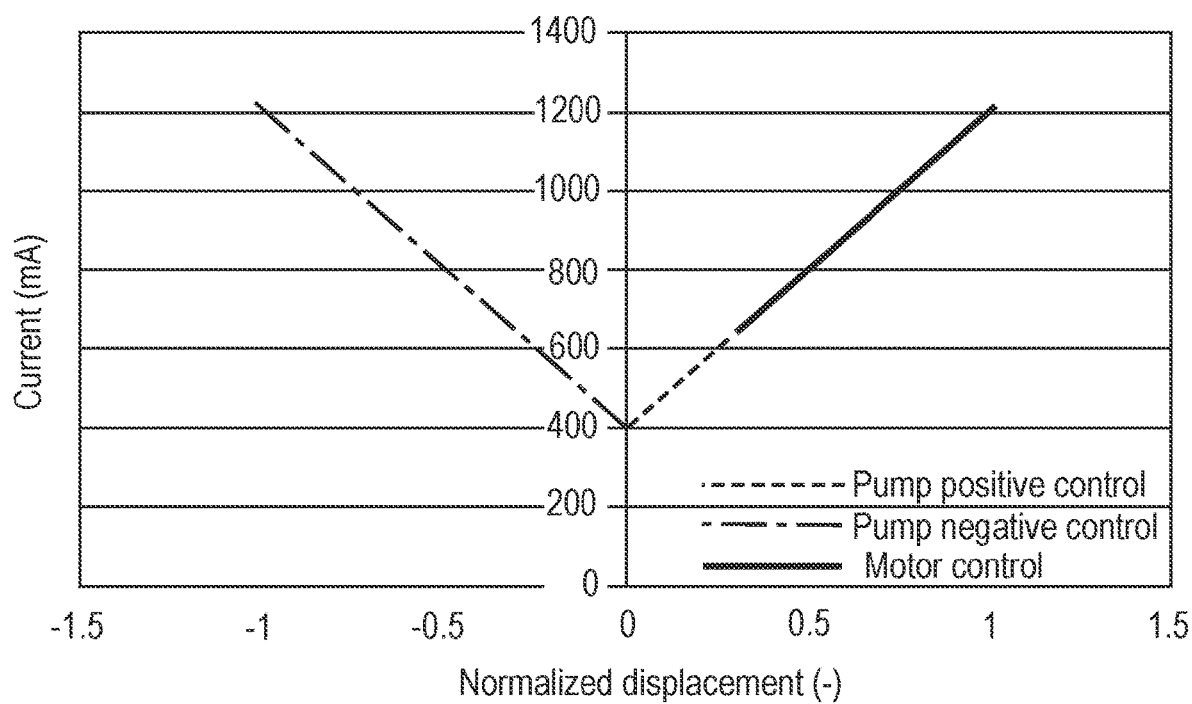
FIG. 9 illustrates a displacement map for a pump and motor of a hydrostatic transmission, usable for various embodiments.

In the example HST 115, there are three main solenoids, two on the pump and one on the motor. These solenoids control the pump positive displacement, the pump negative displacement and the motor displacement. As such, the commanded value of transmission ratio is translated into corresponding values of electrical current to be sent to each solenoid to control its displacement. The relationship between current and normalized displacement, that is, the fraction of maximum displacement, is illustrated in FIG. 9. Because the motor of this described embodiment is mechanically limited to a minimum normalized displacement of 0.3, the minimum current value sent to the motor's displacement solenoid is 640 mA. Because both pump solenoids oppose each other's motion to control the direction of the pump swash plate travel, only one pump solenoid is active at any given time.

Control Limitations

For the embodiment illustrated in FIGS. 3, 4, 6, and 11-23, there are limited feedback signals available to the vehicle systems manager 140. Specifically, the available feedback signals are the actual engine speed (aRPM) which is sent from the ECU 125 or an engine RPM sensor, and the actual vehicle velocity which may, in some embodiments, be calculated by the vehicle systems manager 140 based on the transmission output shaft speed (TOSS). Other embodiments may measure speed in another suitable fashion, such as monitoring wheel speed, or via an independent speed sensor. Other embodiments may have additional and/or different feedback signals for the controller.

Without knowing the torque output of the engine or the system pressure of the hydrostatic transmission, it is possible to command an increase in transmission ratio that may exceed the capability of the engine to maintain vehicle motion. This poses a substantial challenge to the development of a control system for a vehicle such as forklift 110 because the vehicle mass, road gradient or the load placed on the engine 100 from hydraulic implements can vary significantly during operation.

Control Strategy

The structure of an example control strategy for forklift 110 includes seven modules, according to various embodiments. These modules are: condition inputs, acceleration control, steady-state control, deceleration control, gain schedule, drive control, and condition outputs. The combined influence of these seven modules determines the magnitude of each signal that is sent from the vehicle systems manager 140 to the ECU 125 and the HST 115. Optionally, these control signals from the vehicle systems manager 140 may be overridden at any time to perform hoisting operations, or to perform inching operations.

To aid understanding, the following control strategies are described with the assumption of 100% transmission efficiency. However, the efficiency of a hydrostatic transmission can vary depending on its operating conditions. Thus, the output from each control module may be compensated to account for such efficiency losses and to ensure that the vehicle drivetrain is operating as desired.

Condition Inputs

In embodiments, the control strategy first interprets the inputs, APP, IBPP and FNR, received at the vehicle systems manager 140 from the driver to determine the desired or target vehicle response and set the value of the desired vehicle velocity (dV). As used herein, "desired vehicle velocity", "target vehicle velocity", "desired vehicle speed" and "target vehicle speed" all refer to this dV.

Figure 10:
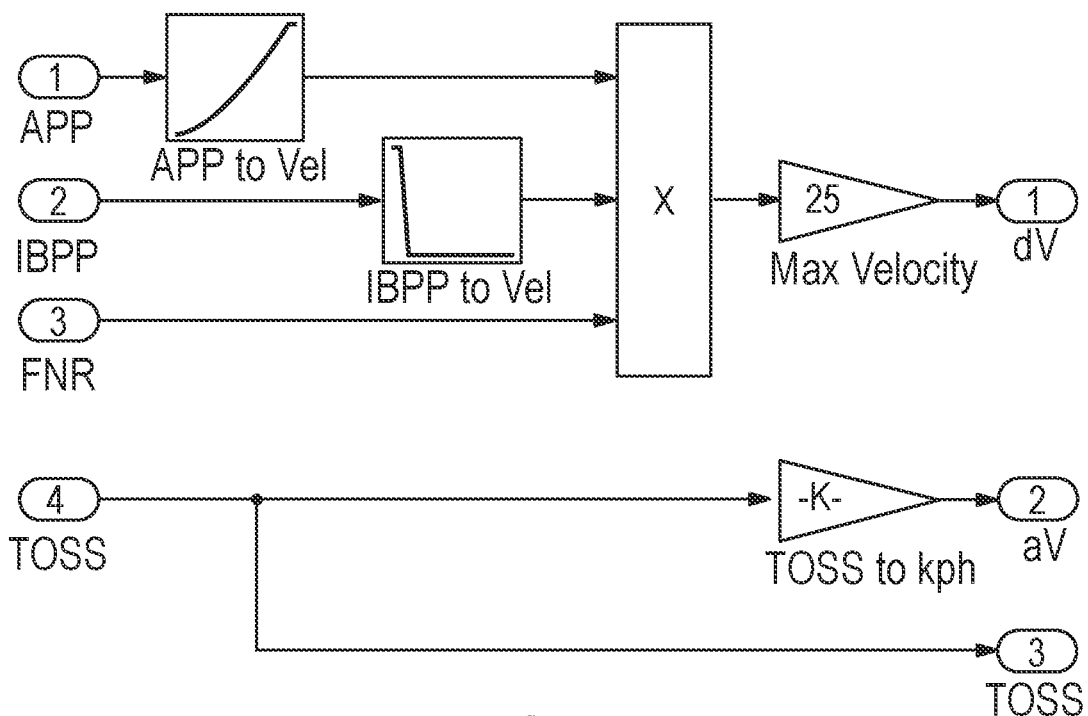
FIG. 10 illustrates a schematic diagram of acceleration, brake, direction, and transmission output shaft speed inputs used by a controller in the forklift of FIG. 2, according to various embodiments.

FIG. 10 illustrates that both APP and IBPP signals, according to one possible embodiment, are related to characteristic curves stored in lookup tables. Other suitable manners for mapping APP and IBPP to values used to determine a desired vehicle velocity may be used in other embodiments. Such curves dictate a scaling factor between zero and one which in turn determines the proportion of the maximum vehicle velocity that the driver is requesting. When combined with the directional input of the FNR switch, the vehicle systems manager 140 determines a desired velocity value that has both a magnitude and a direction. Additionally, the feedback signal of transmission output shaft speed (TOSS), in some embodiments, is scaled by the vehicle systems manager 140 to determine the actual vehicle velocity (aV) by taking into account the gear ratios downstream of the HST 115 as well as the wheel circumference.

Acceleration Control

The driver's input of APP and IBPP are interpreted as a demand for a desired velocity and are related to the available power output from the engine 100. Doing so includes the driver as part of the vehicle velocity feedback loop.

For example, in situations where the power required to maintain vehicle motion increases (such as when the forklift 110 is loaded or traveling uphill) then the driver will naturally depress the acceleration pedal further to compensate, thereby increasing the desired engine speed and the available power output from the engine, thus allowing the desired velocity to be maintained. Similarly, when the power required to maintain vehicle motion decreases (such as when the forklift 110 is unloaded or traveling downhill) then the driver will also compensate by not depressing the accelerator pedal as far to achieve the same desired velocity. Such natural modulating behavior by a driver may somewhat obviate the need for full closed-loop velocity control.

Figure 11:
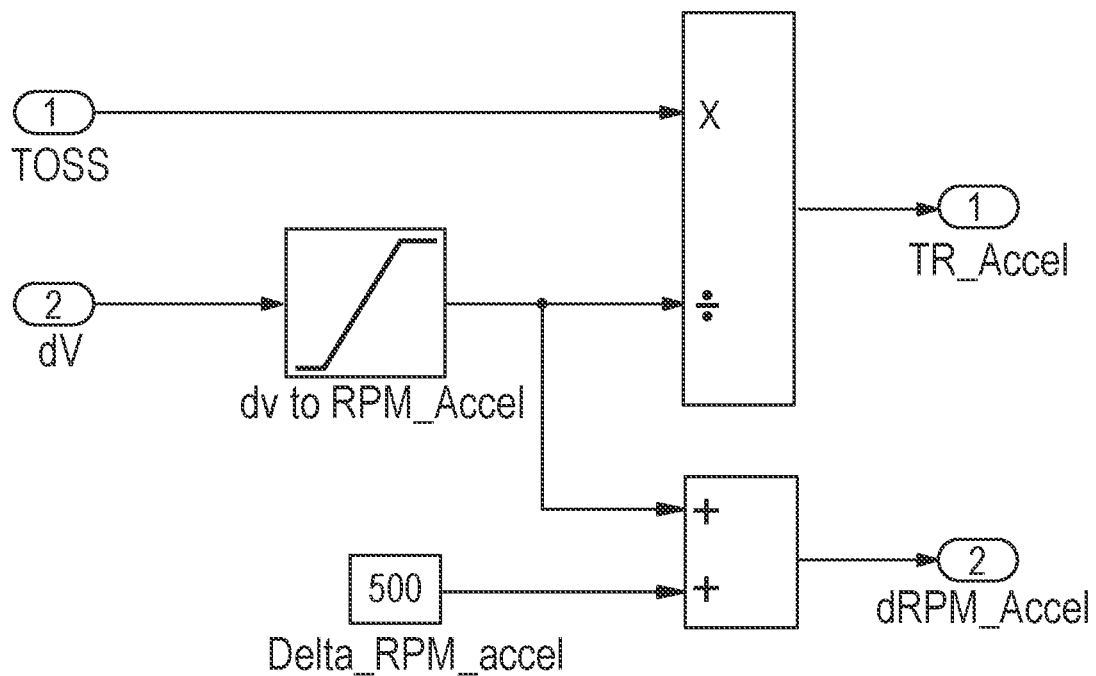
FIG. 11 illustrates a schematic diagram of the controller in the forklift of FIG. 2 determining a transmission ratio for acceleration and a desired engine speed for acceleration, according to various embodiments.

FIG. 11 illustrates the above approach inside the acceleration control module that is programmed into the vehicle systems manager 140. First, the driver's input of APP and IBPP (translated to a desired velocity value, dV, in the condition inputs module) are related to the selected engine speed at which acceleration events will occur (RPM_Accel). Therefore, the more the accelerator pedal is depressed, the greater the value of engine speed that will be determined and thus the more power that is available from the engine 1000 to accelerate the forklift 110.

Because the example embodiment does not control the torque output of the engine 100 directly and because it is desirable to operate the engine 100 at as high a torque as possible for a given power output as described above, the second function of the acceleration control module is to command the ECU 125 to apply the maximum engine torque during acceleration events. Application of maximum engine torque during acceleration is achieved by requesting a desired engine speed (dRPM_Accel) that is greater than the selected engine speed for acceleration (RPM_Accel). The result is that the ECU 115 applies maximum torque to try to minimize the gap between the desired and actual engine speeds. FIG. 11 also illustrates that an additional magnitude of engine speed (delta_RPM_Accel) is added to the selected engine speed to cause the ECU 115 to receive a request for a target engine speed that is higher than the selected value. This ensures that the ECU 115 applies maximum torque during vehicle acceleration.

To hinder the actual engine speed from increasing and thereby causing the ECU 115 to reduce the engine torque output, the transmission ratio is controlled in such a way as to hold the actual engine speed at the selected value (RPM_Accel) as the vehicle accelerates. Holding the actual engine speed at RPM_Accel is achieved by monitoring the increase in transmission output shaft speed (TOSS), that results due to the increase in engine speed, over a given time period and by compensating the transmission ratio accordingly such that the wheel speed continues to increase while the engine speed is held relatively constant.

For example, if a driver depresses the acceleration pedal by 50% a request for a desired velocity of 12.5 kph is transmitted to the vehicle systems manager 140. In this case, the vehicle systems manager 140 uses the profile that relates desired velocity to engine speed (dV to RPM_Accel) to determine a desired value of 1500 rpm. Adding 500 rpm, or any other suitable value, to the desired value of 1500 rpm means that the ECU 115 is sent a request for 2000 rpm. The ECU 115 opens the throttle fully to apply maximum torque because the actual engine speed is significantly less that the desired engine speed. Opening the throttle fully causes the engine to accelerate. After a given time interval, if the engine speed has increased by 5% above the selected value of 1500 rpm, the transmission output shaft speed (TOSS) will also have increased by roughly 5% because the transmission ratio is held constant during the given time interval. If the vehicle systems manager 140 increases the transmission ratio by 5% during the following time interval then the engine speed will return to 1500 rpm because of the TOSS becoming a higher value. In the example embodiment, the given time period used by the vehicle control system 120 is 0.01 sec. Therefore, the described iterative calculation process may be performed at such a rate that the engine is held at an approximately constant rpm value while the forklift 110 accelerates. For the example embodiment, the desired transmission ratio for the HST 115 (TR_Accel) is calculated as the actual value of TOSS divided by the constant value of selected engine speed (RPM_Accel).

This approach provides an elegant solution to the fact that in the example embodiment the power output of the engine is not a variable that can be controlled directly by the vehicle systems manager 140 and that relating the driver's input to available power is a desirable feature of the control strategy.

Figure 12:
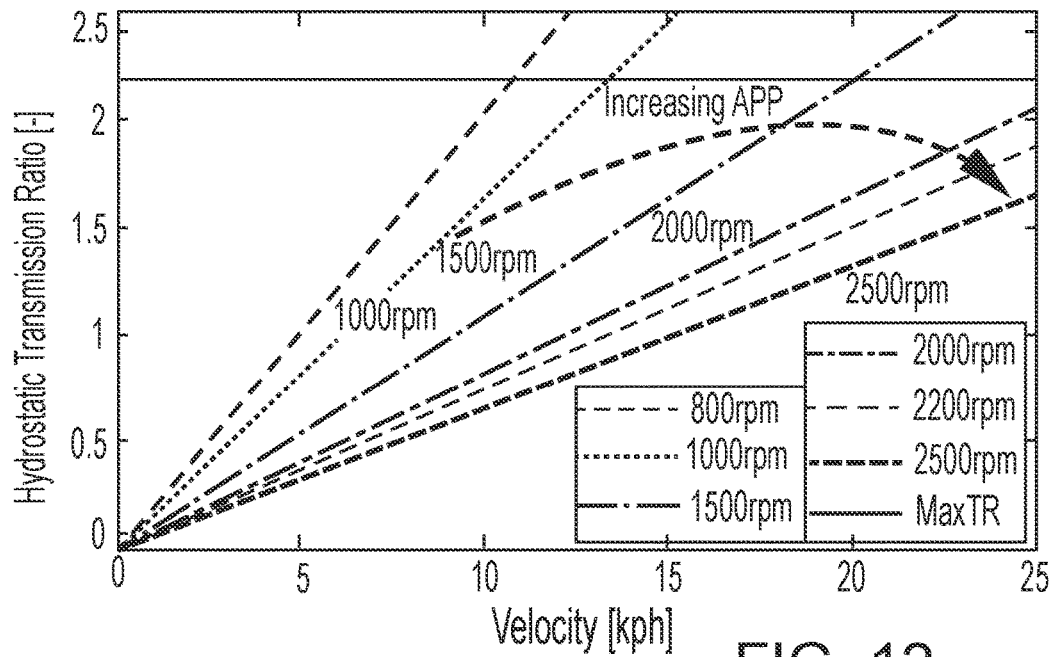
FIG. 12 illustrates a map of the magnitude of accelerator input used to determine the selected engine speed for the forklift of FIG. 2, according to various embodiments.

FIG. 12 illustrates the magnitude of the driver's pedal input being used to determine the selected engine speed for forklift 110 acceleration as any continuous value between the minimum and maximum allowable engine speeds, which are set at 1000 rpm and 2500 rpm, respectively, for the example embodiment. The APP map in FIG. 12 controls the path that the engine and transmission follow as the forklift 110 accelerates along the x-axis of the map.

In various embodiments, the acceleration module relates the driver's APP and IBPP input to an engine speed at which acceleration events occur. Because the maximum output torque is maintained for a selected engine speed, the driver's pedal input effectively determines the power that is available to accelerate the forklift 110 to the desired velocity. Situations that require less than the maximum available power at the minimum engine speed are discussed below.

One feature of the above-described example control strategy is that it accelerates the engine 100 before the transmission ratio increases. Thus, this strategy can compensate for situations when the power available for forklift 110 acceleration changes as a result of external conditions, such as when the forklift 110 is loaded, traveling uphill or performing hydraulic operations.

Because maximum torque output is requested from the engine 110 in the instant example, only torque that is available above the demand of the hoist system 130 and drivetrain 105 will cause the engine 100 to accelerate and thus cause the vehicle systems manager 140 to change the transmission ratio. As a consequence, if all of the available engine torque is required for either travel or hoisting, the engine 100 will not accelerate and the transmission ratio will remain constant. Not accelerating the engine speed can prevent the engine 100 from stalling, because the transmission ratio does not change to exceed the capability of the engine for a given set of external circumstances.

Steady-State Control

The steady-state control module programmed in the vehicle systems manager 140, in various embodiments, controls the drivetrain to enhance efficiency when the forklift 110 travels at a desired steady-state condition of vehicle speed and torque, as defined by the driver's manipulation of APP and IBPP. For the embodiment described with respect to FIGS. 3, 4, 6, and 11-23, objectives for steady-state operation are to use a low engine speed, use a high engine torque, and use a high transmission ratio.

Because the above objectives are complementary, for some embodiments a theoretical target value of transmission ratio that results in the minimum possible engine speed and therefore the maximum possible engine torque for any given vehicle velocity may be calculated, assuming that sufficient torque is available from the engine 100 to supply the required power at such reduced rotational speed. As discussed above, other embodiments may target an optimum engine speed and torque that is different than the minimum possible engine speed, depending upon the characteristics of engine 100, to achieve optimal efficiency.

Figure 13:
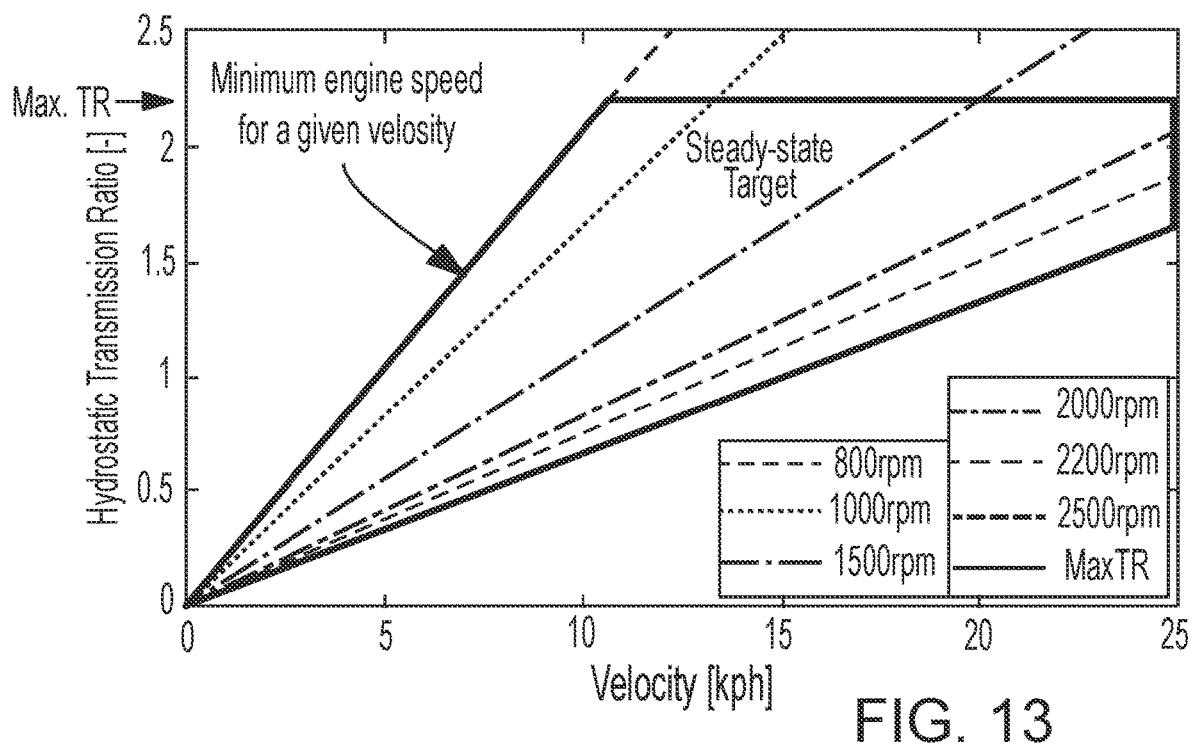
FIG. 13 illustrates a map of target engine speeds and transmission ratios for vehicle velocity for the forklift of FIG. 2, according to various embodiments.

For example, FIG. 13 illustrates that for any given vehicle speed up to 10 kph, the engine may be operated at its minimum rotational speed of 800 rpm because there is sufficient transmission ratio available to achieve the desired wheel speed. However, for speeds greater than 10 kph the minimum possible engine speed increases as the limit of maximum transmission ratio restricts the ability to minimize engine speed with increasing vehicle velocity. The thick line shown in FIG. 13 shows this theoretical target for the minimum possible engine speed that can be achieved for any given vehicle velocity. In FIG. 13, prior to reaching the maximum transmission ratio, this minimum speed is coincident with the idle speed of engine 100, viz. 800 rpm. It may be observed that the minimum engine speed defined by the thick line turns flat for a steady-state target once the minimum engine speed reaches the maximum transmission ratio, indicating that the minimum possible engine speed increases as vehicle speed increases due to the transmission being unable to provide a greater ratio. Establishing engine speed based on a theoretical target is discussed in further detail below with respect to a gain schedule and self-tuning.

Figure 14:
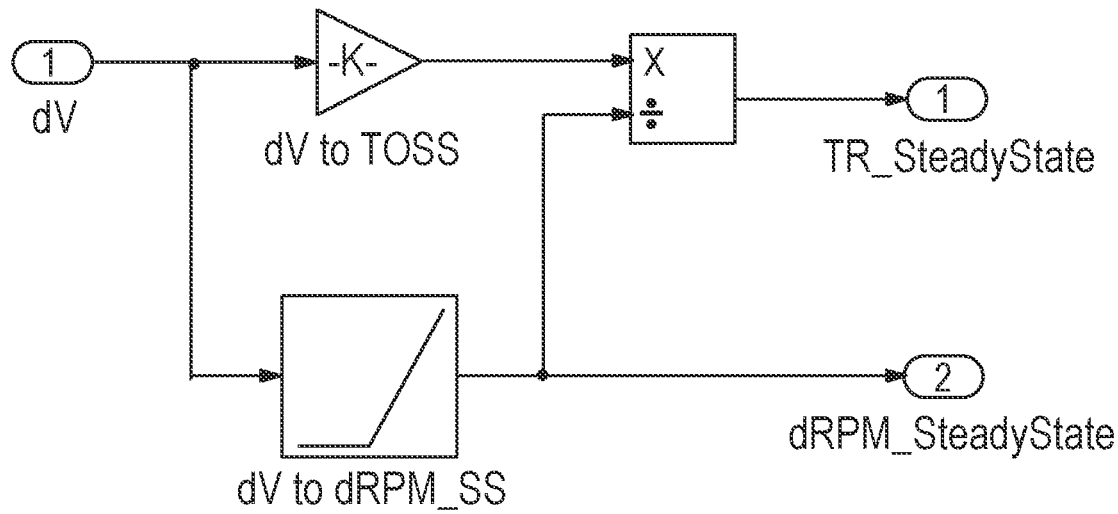
FIG. 14 illustrates a schematic diagram of the controller of the forklift of FIG. 2 determining a steady-state transmission ratio and a steady-state engine rpm, according to various embodiments.

In terms of the control structure, in the embodiment described with respect to FIGS. 3, 4, 6, and 11-23, the target engine speed for steady-state operation at a given vehicle velocity is stored in a lookup table (dV to dRPM_ss), as shown in FIG. 14. Because both the desired engine speed and the desired transmission output shaft speed are defined by the desired velocity value, the theoretical transmission ratio for steady-state operation may be calculated and sent to HST 115 while the desired engine speed is sent to the ECU 125.

Deceleration Control

Another aspect of transient vehicle control is deceleration. There are typically three main sources that contribute to deceleration in vehicles with CVTs, specifically, friction brakes, engine braking, and CVT braking.

For the embodiment described with respect to FIGS. 3, 4, 6, and 11-23, because hydrostatic braking without a full-flow relief valve in the HST is more effective when the vehicle is at or close to rest, the deceleration strategy incorporates engine braking to enhance controllability of the vehicle before friction brakes may be applied.

The deceleration module programmed in the vehicle systems manager 140 holds the engine speed at a specific value as the vehicle velocity decreases. Holding the engine speed at a specific value causes the vehicle to decelerate at a rate that is proportional to the power absorbed by the engine 100 at this engine speed.

Figure 15:
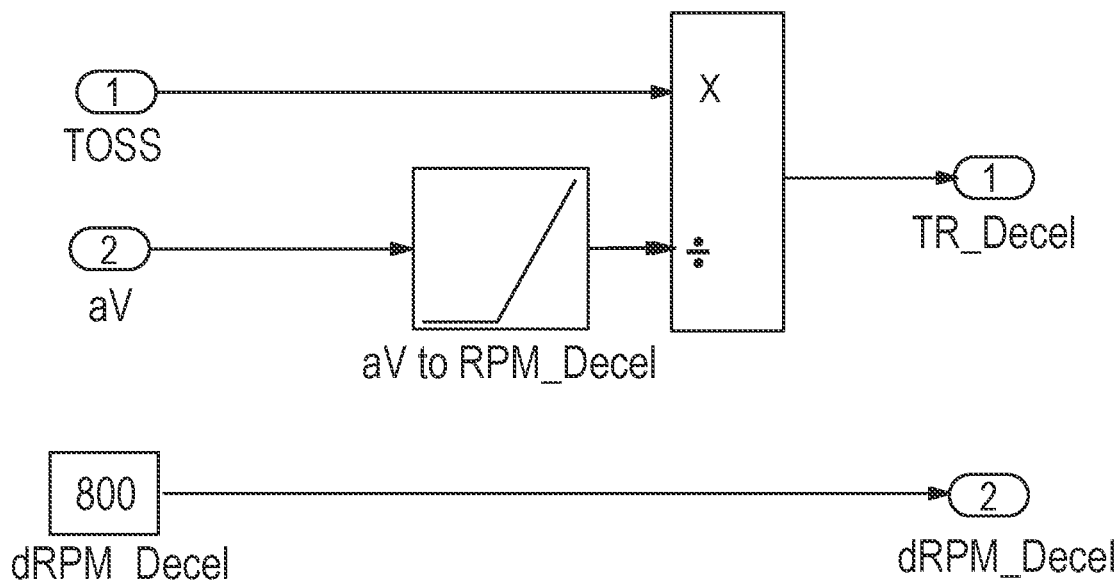
FIG. 15 illustrates a schematic diagram of the controller of the forklift of FIG. 2 determining a deceleration transmission ratio and a deceleration engine rpm, according to various embodiments.

The magnitude of the selected engine speed for deceleration (RPM_Decel) may be set inside the vehicle systems manager 140, as a constant value in some embodiments, and/or a variable based on the actual vehicle velocity, for example, as illustrated by the lookup table in FIG. 15 (aV to RPM_Decel). Setting the engine speed for deceleration as a variable based on the actual vehicle velocity provides for the response of the vehicle to a 'lift off' in pedal position (such as partially letting up on the accelerator pedal, as reflected in the APP), which may be tuned to suit a driver's preference.

The transmission ratio (TR_Decel) for achieving the engine speed for deceleration (RPM_Decel) may be calculated in real-time based on the measured value of TOSS received by the vehicle systems manager 140. During deceleration, the inertia of the forklift 110 causes the wheels to drive the engine 100 at the selected engine speed for deceleration (RPM_Decel). ECU 125 may not be involved in driving the engine 100 during deceleration. Alternatively, the deceleration module may request the engine idle speed from the ECU 125 to inhibit torque from being applied by the engine 100 to the wheels. In other embodiments, ECU 125 and/or engine 100 may offer some form of enhanced braking, such as via compression braking.

Figure 16:
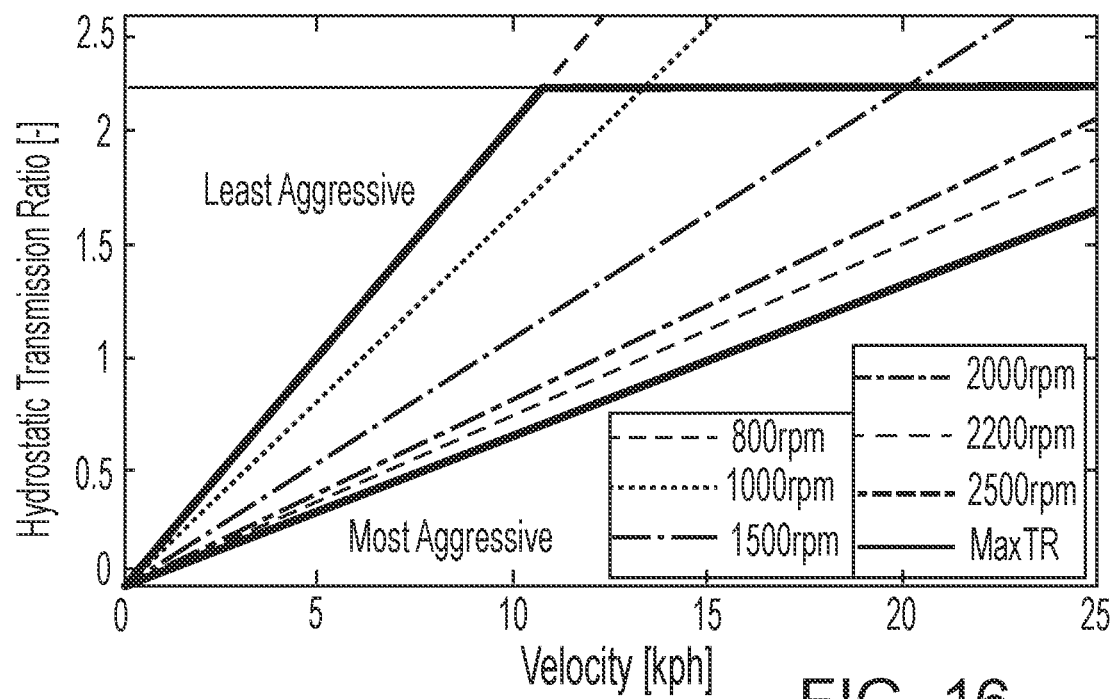
FIG. 16 illustrates a deceleration map for the example forklift of FIG. 2, usable for various embodiments.

FIG. 16 illustrates optional tuning of the contribution of engine braking to vehicle deceleration. By controlling the transmission ratio with respect to vehicle velocity, the engine 100 may be operated at any speed within the limits of the least aggressive setting, where engine braking is minimized, and the most aggressive setting, where engine braking is maximized. The rpm speed path taken by the engine 100 as the forklift 110 decelerates may be adjusted by changing the values stored in the lookup table illustrated in FIG. 15. However, in the disclosed embodiment, the transmission ratio should not be reduced too rapidly to prevent the inertia of the forklift 110 causing the engine to over-speed, as forklift 110 decelerates.

The deceleration control module described above maintains a fixed engine braking power instead of a specific deceleration rate. For the above-described embodiment, the rate at which the vehicle decelerates depends on external factors such as road gradient or truck loading, and may be increased by the application of the friction brakes. In other embodiments, the selected engine speed for deceleration (RPM_Decel) may be adjusted to maintain a specific deceleration rate and a full-flow relief value to prevent engine over-speed may be installed.

When the friction brakes are applied, the feedback signal of TOSS will decrease and thus the transmission ratio is compensated at a greater rate to maintain the selected engine speed for deceleration (RPM_Decel).

Gain Schedule

An example gain schedule is described below, however the gain schedule is flexible and can be set to user preferences. For example, different gain schedules may be used to provide more or less aggressive acceleration characteristics, greater or less aggressive deceleration characteristics, or to otherwise influence the behavior of a vehicle with a continuously variable transmission and a transmission control as claimed below.

Managing and implementing the above-described control strategies, acceleration, steady-state, and deceleration, while the forklift 110 is in operation and without input from the driver other than APP, IBPP, and FNR, may benefit from additional processing.

For example, at any given time the acceleration, steady-state, and deceleration modules will each have different demands for engine speed and transmission ratio to implement their respective strategy. Choosing the correct values for engine speed and transmission ratio, in a given embodiment, may not be as simple as selecting one combination of acceleration, steady-state, and deceleration, over another combination, especially when the forklift 110 may transition between states of acceleration, deceleration, and steady-state travel. Thus, a blend of the above-three strategies may be beneficial.

The following considerations may help determine which strategy, or mix of strategies, should have control over the drivetrain 105: With respect to the vehicle's current velocity, is the vehicle traveling significantly slower than the desired velocity? Is the vehicle traveling slightly slower than the desired velocity? Is the vehicle at the desired velocity? Is the vehicle traveling slightly faster than the required desired. Or, is the vehicle traveling significantly faster than the required desired?

Expanding upon these considerations, with respect to the vehicle's acceleration request, is the vehicle requested to accelerate significantly, for example, by commanding an engine power in a range of 95% to 75% of the engine's power capability? Is the vehicle requested to accelerate marginally, for example, by commanding an engine power in a range of 74% to 50% of the engine's power capability? Is the vehicle requested to maintain the current velocity? Is the vehicle requested to decelerate marginally, for example, in a range of 74% to 50% of available engine braking power? Or, is the vehicle requested to decelerate significantly, for example, 100% to 75% of available engine braking power? One of skill in the art will readily understand that available engine braking torque or power is typically a percentage of the engine's available acceleration power. For example, 100% of an engine's available braking power may be ⅓ of the engine's 100% acceleration power.

Based on the answers to the vehicle's current velocity question and the vehicle's acceleration request question, vehicle systems manager 140 may be programmed to apply the acceleration strategy, transition from the acceleration to the steady-state strategy, apply the steady-state strategy, transition from the steady-state to the deceleration strategy, or apply the deceleration strategy, singularly, or in any combination.

To facilitate the programming in the vehicle systems manager 140 making a real-time determination regarding which strategy, or blend of strategies, to use, a gain scheduled approach may be employed. Such a gained scheduled approach provides for any one strategy having full control of the drivetrain 105, or a blend of two or more strategies sharing control of the drivetrain 105, for example, when transitioning from one state to another.

The gain scheduled approach assigns coefficients (called gains) ranging from zero to one that determine the priority that each strategy has over the desired values of engine speed and transmission ratio, which are sent to the ECU 125 and HST 115, respectively, from the vehicle systems manager 140. For the embodiment described with respect to FIGS. 3, 4, 6, and 11-23, the gain value associated with each strategy is labeled as Alpha ($\alpha$), for the acceleration strategy, Beta ($\beta$) for the steady-state strategy, and Gamma ($\gamma$) for the deceleration strategy.

The magnitude for each gain value, $\alpha$, $\beta$, and $\gamma$, may be determined by the magnitude of a coefficient, referred to here as Lambda ($\lambda$) for the embodiment described with respect to FIGS. 3, 4, 6, and 11-23. Lambda therefore relates each gain $\alpha$, $\beta$, and $\gamma$, to the ratio between the actual vehicle velocity and the desired vehicle velocity. In one embodiment, the value of lambda can be calculated as:

$$\lambda = |aV|/|dV|$$

Where $\lambda$=lambda (unit-less)
aV=actual velocity (kph)
dV=desired velocity (kph)

Figure 17:
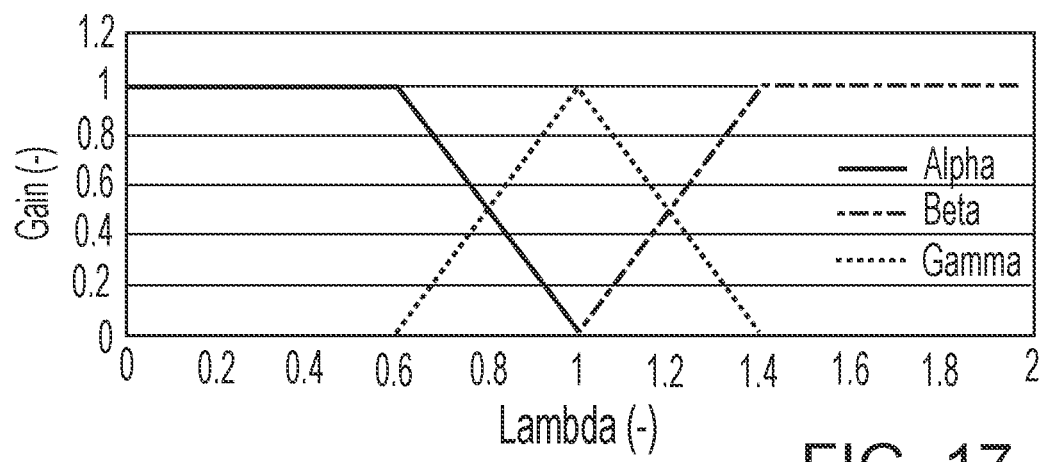
FIG. 17 illustrates a possible embodiment of a map of the magnitude of each gain value $\alpha$, $\beta$, and $\gamma$ varying with the Lambda coefficient for a gain scheduled approach for the forklift of FIG. 2, according to various embodiments.

FIG. 17 illustrates how the magnitude of each gain value $\alpha$, $\beta$, and $\gamma$ varies with the Lambda coefficient, which, for the embodiment described with respect to FIGS. 3, 4, 6, and 11-23 is limited to range between zero and two. The sum of the three gain values $\alpha$, $\beta$, and $\gamma$ equates to a value of one, but the individual value for each of the gain values α, β, and γ is influenced by the value of Lambda.

The gain scheduled approach manages the acceleration or deceleration of the forklift 110 such that the actual velocity is equal to, or approximately equal to, the desired velocity selected by the driver. When the actual velocity is equal to, or approximately equal to, the desired velocity selected by the driver, lambda has a value of one, and the vehicle is traveling in steady-state at the desired velocity. The gain scheduled approach, in various embodiments, includes five states for the vehicle control strategy. These five states are acceleration, acceleration to steady-state transition, steady-state, steady-state to deceleration transition, and deceleration.

Figure 18:
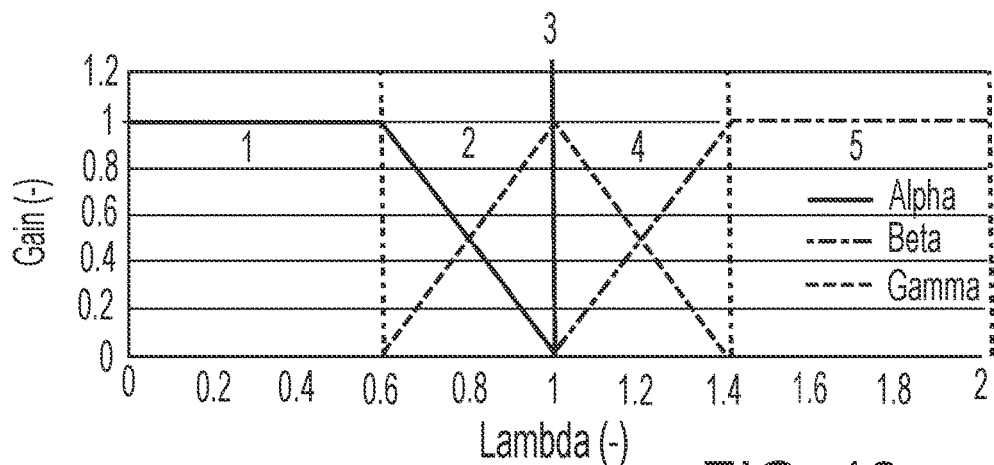
FIG. 18 illustrates a possible embodiment of a transition map between acceleration, acceleration to steady-state transition, steady-state, steady-state to deceleration transition, and deceleration for the forklift of FIG. 2, according to various embodiments.
Figure 19:
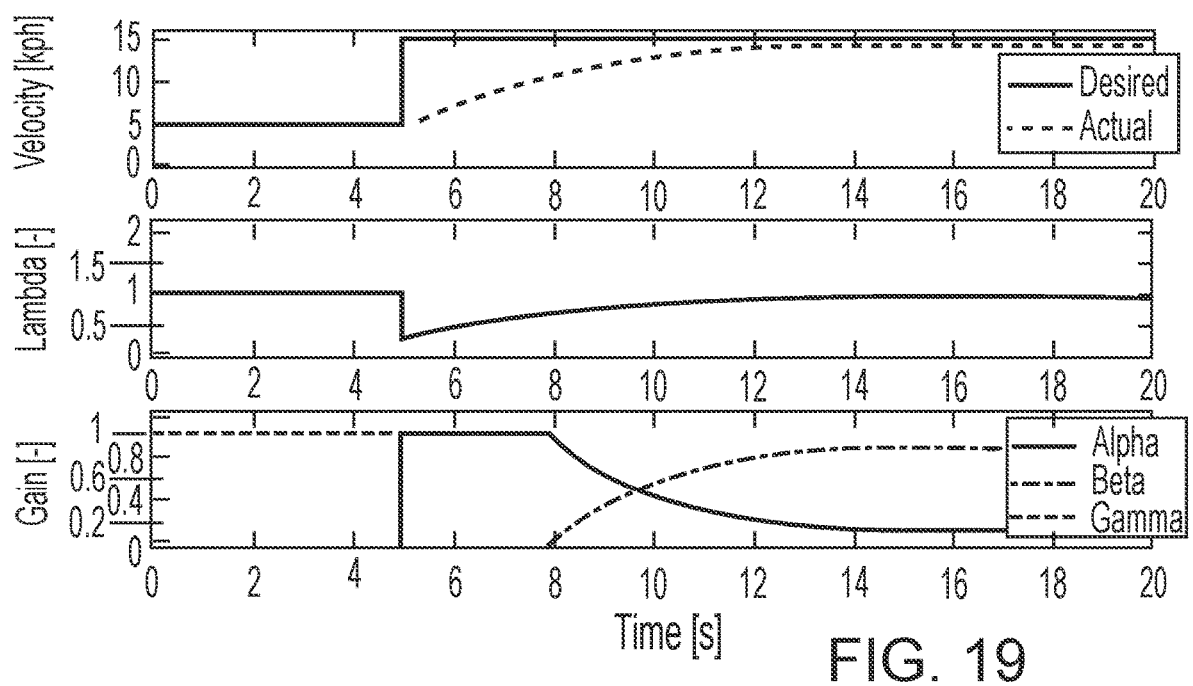
FIG. 19 illustrates example maps comparing velocity, lambda coefficient, and gain value for $\alpha$ and $\beta$ as the forklift of FIG. 2 transitions from steady-state travel to accelerated travel, according to various embodiments.

FIG. 18 illustrates each of these five states identified with respect to one embodiment of the gain schedule. An example case using the gain scheduled strategy is described below. While FIG. 18 illustrates the vehicle controller transitioning from the acceleration to the steady-state control strategy when lambda has a value of 0.6, that is, when the actual velocity reaches 60% of the desired velocity, the point at which such transition occurs may be adjusted to change the behavior of the vehicle.

For example, increasing the lambda value at which the transition from acceleration to steady-state occurs causes the forklift 110 to remain under the influence of the acceleration control strategy for a longer time. In such embodiments, the transition to steady-state control occurs more rapidly as lambda approaches a value of one. Therefore, the forklift 110 will feel more aggressive to the driver as it accelerates for a longer time and the transition to steady-state control is more notable.

On the other hand, in embodiments that employ a comparatively decreased lambda value at which the transition from acceleration to steady-state occurs, the change between vehicle control strategies will be less perceptible to the driver and the forklift 110 will appear to be less aggressive and smoother. Similarly, the deceleration behavior of the vehicle can be tuned by shifting the transition point between the deceleration strategy and the steady-state control strategy. In other words, changing the lambda value of 1.4, which is when the actual velocity reaches 140% of the desired velocity, changes the behavior of the forklift 110.

These two tuning aspects allow for the vehicle designer to select a suitable trade-off between vehicle productivity and fuel consumption as well as allowing for the 'feel' of the vehicle to be changed, providing great flexibility in the characteristic behavior of the vehicle.

To illustrate the application of the lambda value in vehicle control, consider a vehicle initially traveling in steady-state at 5 kph. Following the graphs presented in FIG. 19, the value of lambda is equal to one for the first 5 seconds because the actual velocity is equal to the desired velocity commanded by the driver's APP and IBPP. With reference to FIG. 18, as illustrated where the x-axis equals one, the vehicle is operating in region three (steady-state) of the gain schedule. As illustrated in FIG. 18, the beta gain has a value of one while the alpha and gamma gains both have a value of zero. Therefore, the control of engine speed and transmission ratio is only influenced by the steady-state control module during the first 5 seconds.

At a time of 5 seconds, the driver depresses the accelerator pedal to request a desired velocity of 15 kph. With the additional depression of the accelerator pedal, the value of lambda decreases to 0.33 because the actual velocity is one third of the desired velocity. With reference to FIG. 18, the vehicle is operating in region one of the gain schedule and the alpha gain has a value of one while the beta and gamma gains both have a value of zero. Therefore, the engine and transmission are only controlled by the acceleration module between 5 seconds and approximately 7.9 seconds, and the vehicle accelerates.

With increasing vehicle velocity, the value of lambda increases and eventually reaches 0.6, which equals a predetermined value for transitioning between acceleration and steady-state phases. As lambda reaches and passes a value of 0.6 the vehicle systems manager 140 begins operating in region two of the gain schedule. During this acceleration to steady-state transition phase, the value of alpha decreases towards zero as the value of beta increases, in this example, at the same rate, towards a value of one. Thus, the engine and transmission are continually under a lessening influence from the acceleration control strategy and an increasing influence from the steady-state control strategy. This change in influence of the acceleration and steady-state control strategies results in the acceleration of the vehicle 'tailing off' until the vehicle is once again operating at, or close to, the desired steady-state velocity requested by the driver's pedal input. In the instant example, when the lambda value reaches approximately one, the vehicle systems manager 140 transitions fully to steady-state operation. In some embodiments, a second predetermined threshold may govern transition into full steady-state operation.

In the embodiment described with respect to FIGS. 3, 4, 6, and 11-23, there is no closed-loop velocity control implemented in the vehicle systems manager 140. Without a closed-loop velocity control the vehicle does not reach the exact desired velocity because of transmission efficiency losses. Therefore, the value of lambda may not return to a value of exactly one and the acceleration strategy will contribute a small quantity, for example with an alpha gain of 0.13, to the final values of desired engine speed and transmission ratio for steady-state travel. In other embodiments, a closed loop velocity control may be included in the vehicle controller and the lambda value may equal one during steady-state vehicle travel.

Drive Control

The drive control module combines the influence of the above-described gain values with outputs from each strategy, acceleration, steady-state, and deceleration, to determine the desired engine and transmission control values.

The commanded values of desired engine speed and transmission ratio are determined by summing the products of each strategy and its respective gain value. In other words, the desired values of engine speed and transmission ratio are obtained from whichever strategy, or mix of strategies, is determined by the vehicle systems manager 140 to have control of the drivetrain 105 based on the gain schedule.

$$d\text{RPM\_Drive} = \alpha \, d\text{RPM\_Accel} + \beta \, d\text{RPM\_SS} + \gamma \, d\text{RPM}$$

Where α=alpha, acceleration gain (unit-less)
β=beta, steady-state gain (unit-less)
γ=gamma, deceleration gain (unit-less)
dRPM_Drive=Desired value of engine speed, sent to ECU (rpm)
dRPM_Accel=Desired engine speed for acceleration (rpm)
dRPM_SS=Desired engine speed for steady-state (rpm)
dRPM_Decel=Desired engine speed for deceleration (rpm)

$$\text{TR\_Drive} = \alpha \text{TR\_Accel} + \beta \, \text{TR\_SS} + \gamma \, \text{TR\_Decel}$$

Where TR_Drive=Commanded value of transmission ratio, sent to HST (unit-less)

TR_Accel=Transmission ratio for acceleration (unit-less)
TR_SS=Transmission ratio for steady-state (unit-less)
TR_Decel=Transmission ratio for deceleration (unit-less)

Figure 20:
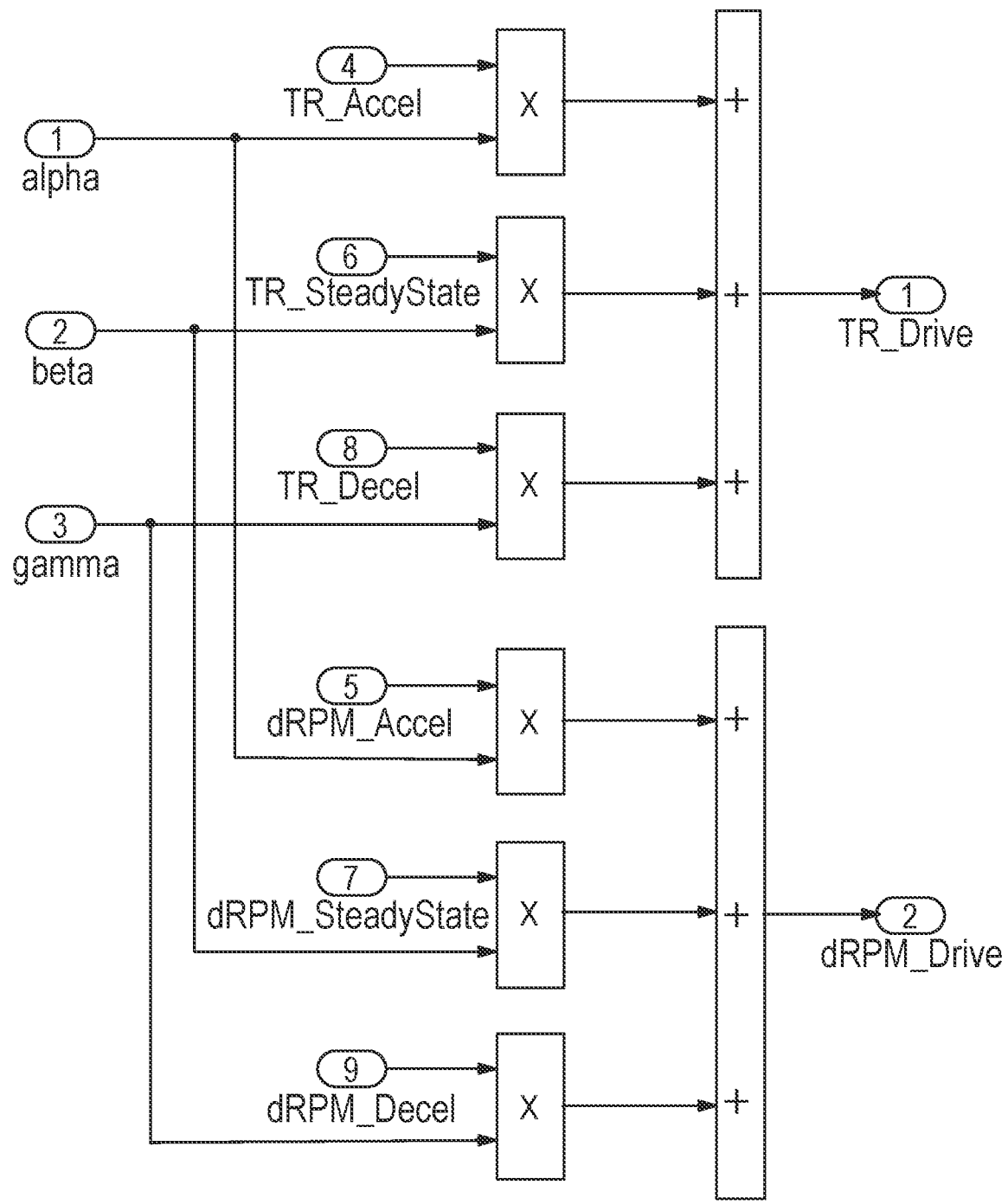
FIG. 20 illustrates a schematic diagram of the controller of the forklift of FIG. 2 determining a drive transmission ratio and an engine drive speed based on a gain scheduled approach, according to various embodiments.

FIG. 20 illustrates a graphical representation of the above two equations structured inside the drive control module. In the embodiment described with respect to FIGS. 3, 4, 6, and 11-23, the transmission control strategy remains in line with the control of the engine from the ECU 125 because the same gain values of alpha, beta, and gamma influence both the control of the engine and control of the transmission in equal measure.

Basic Control Structure

Figure 21:
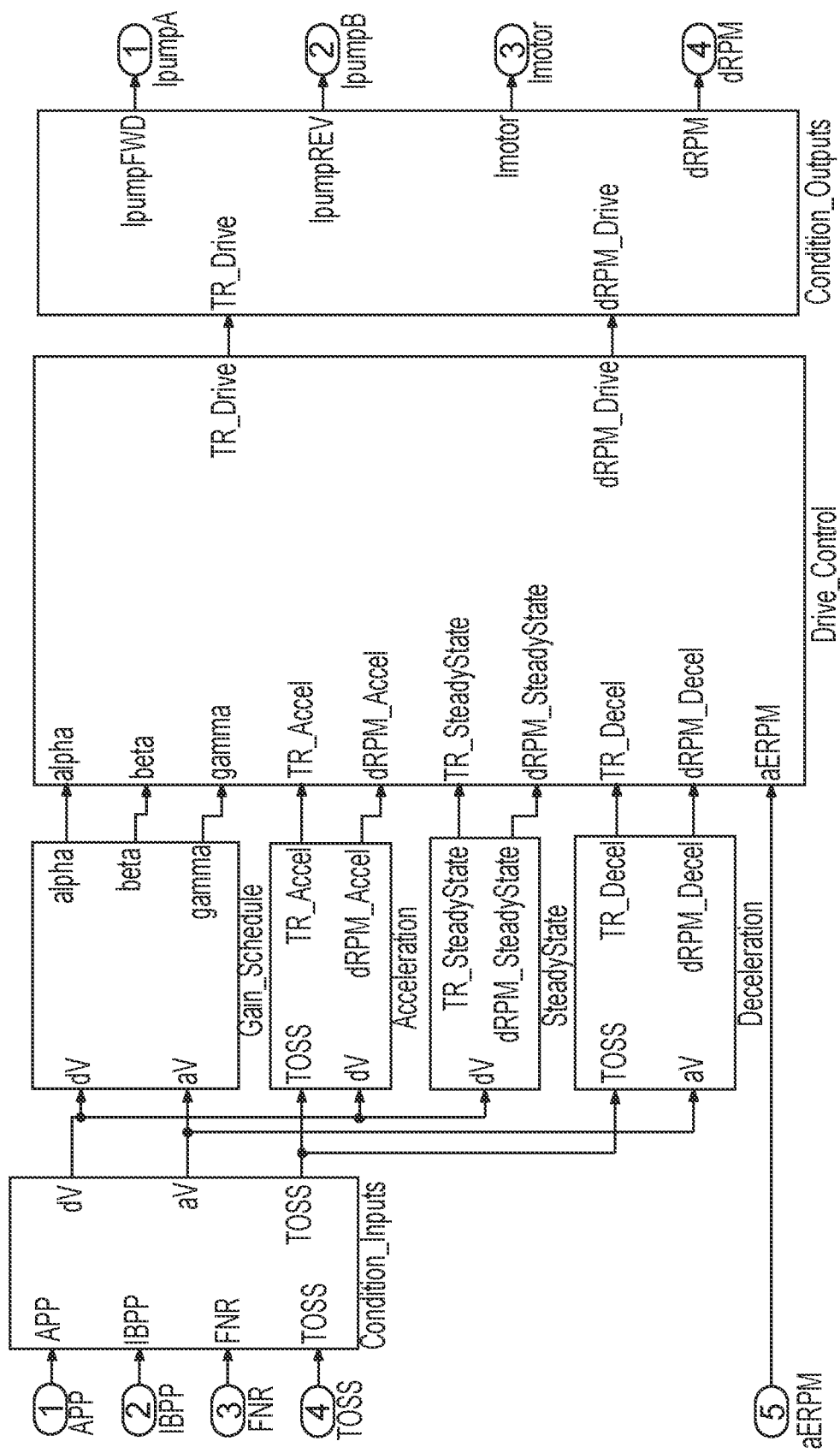
FIG. 21 illustrates a schematic diagram of inputs and outputs for the controller of the forklift of FIG. 2, according to various embodiments.

FIG. 21 illustrates a logic diagram of the seven modules described previously arranged inside the vehicle systems manager 140 such that the path of the control logic flows from the inputs, shown on the left as APP 1, IBPP 2, FNR 3, TOSS 4, and aERPM 5, to the outputs, shown on the right as IpumpA 1, IpumpB 2, Imotor 3, and dRPM 4.

Hoisting Overrides

The control structure presented above may also, in various embodiments, include the ability for an auxiliary function to override the drive control strategy. For example, for the forklift 110 the hoist control is deemed to have priority over travel because of the operational requirements of forklift 110. As discussed above, the hoist system 130 having priority over the drive system occurs when the hoist system 130 requires a different (usually higher) engine speed than what is output by the drive control strategy.

As discussed above with respect to the acceleration, steady-state, and deceleration modules, the vehicle systems manager 140 utilizes each module to determine the value of the transmission ratio in real-time based on input values of engine speed and vehicle speed. When the hoist system 130 overrides the drive system, the vehicle systems manager 140 intercepts the values of engine speed determined from the acceleration, steady-state, and deceleration modules such that the output values for the transmission ratio may be adjusted accordingly to maintain vehicle velocity when performing hoisting operations that need a higher or different engine speed than the drive system needs.

To override the acceleration control module, in embodiments the vehicle systems manager 140 may increase the selected engine speed for acceleration events (RPM_Accel) as output by the drive control strategy to the new value requested by the hoist control strategy. Therefore, the above-described strategy of using the transmission to hold a specific engine speed during acceleration applies and the transmission ratio is commanded to increase at a rate that is within the capability of the engine. In this case, only the available torque that is surplus to the demand of the hoist system causes the vehicle to accelerate.

The above-described steady-state strategy operates the engine at the minimum speed for a selected vehicle velocity. Therefore, if the vehicle is traveling in steady-state and hoisting is commanded that requires a higher engine speed, the vehicle systems manager 140 is programmed to reduce the transmission ratio such that the engine speed increases to the value needed by the hoist system 130. Also, because the engine is now operating at a higher speed than before, less torque is needed to achieve the same power output for maintaining vehicle motion, which increases the amount of engine torque available to perform hoisting operations while traveling.

Because the deceleration control strategy relies on the inertia of the vehicle to drive the engine at a specific speed, the transmission ratio can be controlled to maintain the engine speed needed for hoisting while the vehicle decelerates. When the vehicle approaches the new value of desired velocity, the influence of the gain schedule will ensure that the ECU 125 begins to apply sufficient engine torque to maintain the vehicle in steady-state while hoisting, as discussed above.

Self-Tuning

A CVT control system, such as the foregoing embodiments of a vehicle systems manager 140 for managing a HST, may be configured to handle variable conditions of vehicle mass, hydraulic demands, and road gradient without input from the driver. The control system can be configured to ensure the engine 100, or other suitable power source, or the HST 115, or other suitable CVT, do not operate outside of their capabilities. In the embodiment described with respect to FIGS. 3, 4, 6, and 11-23, the control system re-evaluates the rpm output to the engine 100 and the transmission ratio control to the HST 115 as described above to account for varying conditions.

The control strategy described above 'self-tunes' its response to the engine 100 and the HST 115 based on the APP and IBPP from the driver. For example, the acceleration strategy accelerates the engine 100 before the transmission ratio of the HST 115 increases. Because external conditions influence the ability of the engine 100 to accelerate, the rate of transmission ratio increase described above adapts to varying situations such that the engine 100 does not stall.

In the embodiment described with respect to FIGS. 3, 4, 6, and 11-23, the gain scheduled approach uses the actual vehicle velocity to determine the state of the control strategy. Therefore, the forklift 110 does not complete the transition from acceleration to steady-state operation unless it is physically possible for the forklift 110 to do so. For example, if the driver depresses the accelerator to set a desired velocity of 15 kph, the acceleration control module operates to hold the engine speed at 2000 rpm while the vehicle accelerates from rest. The HST 115 is controlled to follow the path illustrated by the thick dot-dash line in FIG. 22 (labeled acceleration path-set by APP).

Once the forklift 110 reaches a velocity of 9 kph (i.e. where $\lambda=0.6$), the control system transitions towards the steady-state target, shown by the thick solid line. The slope of the gain schedule determines the path that is taken towards the steady-state target, influencing the control of the engine 100 and HST 115.

If external conditions are such that is it not possible for the forklift 110 to reach the desired velocity of 15 kph, the transmission ratio only increases to a point where the engine can no longer accelerate, that is, when there is no additional torque output available. Therefore, the forklift 110 settles at an intermediate velocity between 9 kph and 15 kph. If either the external factors change or the driver changes the APP input, and thereby changes the path of transmission ratio control that is followed with respect to vehicle velocity, then the forklift 110 begins to accelerate again and continues to do so until the desired velocity is reached or there is no additional torque output available from the engine 100.

Therefore, the engine 100 and HST 115 are not operated beyond their capabilities in any given situation. The driver may influence the power that is available from the engine 100 at any moment by changing the APP and/or IBPP, and thus the path that the transmission ratio follows in reaching the desired velocity indicated by the APP and/or IBPP.

Because the value of lambda is influenced by the actual vehicle velocity and the desired velocity, the control system may change states and enter a different region of the gain schedule based on different values of lambda. For example, if forklift 110 is traveling on level ground at a steady-state velocity then the road gradient increases, the value of lambda decreases even if the driver does not change the APP to change the desired velocity. While the forklift 110 decelerates and the value of lambda continues to decrease, the control strategy returns to the acceleration state to control the transmission ratio to maintain a velocity that is proportional to the available power from the engine 100 and accounts for the external conditions of the road gradient increase. The forklift 110 remains at a new, lower velocity unless the external conditions change, for example, the road flattens, or the driver applies more engine power by increasing the APP.

Desired vs. Actual Transmission Ratio

For clarity and understanding, the above-described control strategies and control structures are based on the assumption of 100% transmission efficiency. In other words, the above-described strategies and structures are described as if the desired transmission ratio, that is, the ratio of pump displacement to motor displacement as commanded through the control of applied solenoid current, is exactly equal to the actual transmission ratio that results, that is, the ratio of transmission output speed to transmission input speed. However, hydrostatic transmissions, and other CVTs, may have variable transmission efficiency, for example, as a result of both volumetric and mechanical losses. Therefore, the desired CVT transmission ratio may be different from the actual CVT transmission ratio that occurs between the power source and the driven wheels.

Therefore, vehicle systems manager 140 may use the feedback signals of engine speed and transmission output shaft speed to determine the actual value of CVT transmission ratio. The actual value of CVT transmission ratio may then be compared to the desired value of CVT transmission ratio that is output from the controller, such as control system 120. When the actual value of CVT transmission ratio is less than the desired value of CVT transmission ratio commanded by the controller, the output of the controller may be compensated to increase the desired value of CVT transmission ratio. Such an increase may cause the actual value of CVT transmission ratio between the input and output shafts of the CVT to match, or substantially match, the original desired value of CVT transmission ratio.

Computer Implementation

Figure 23:
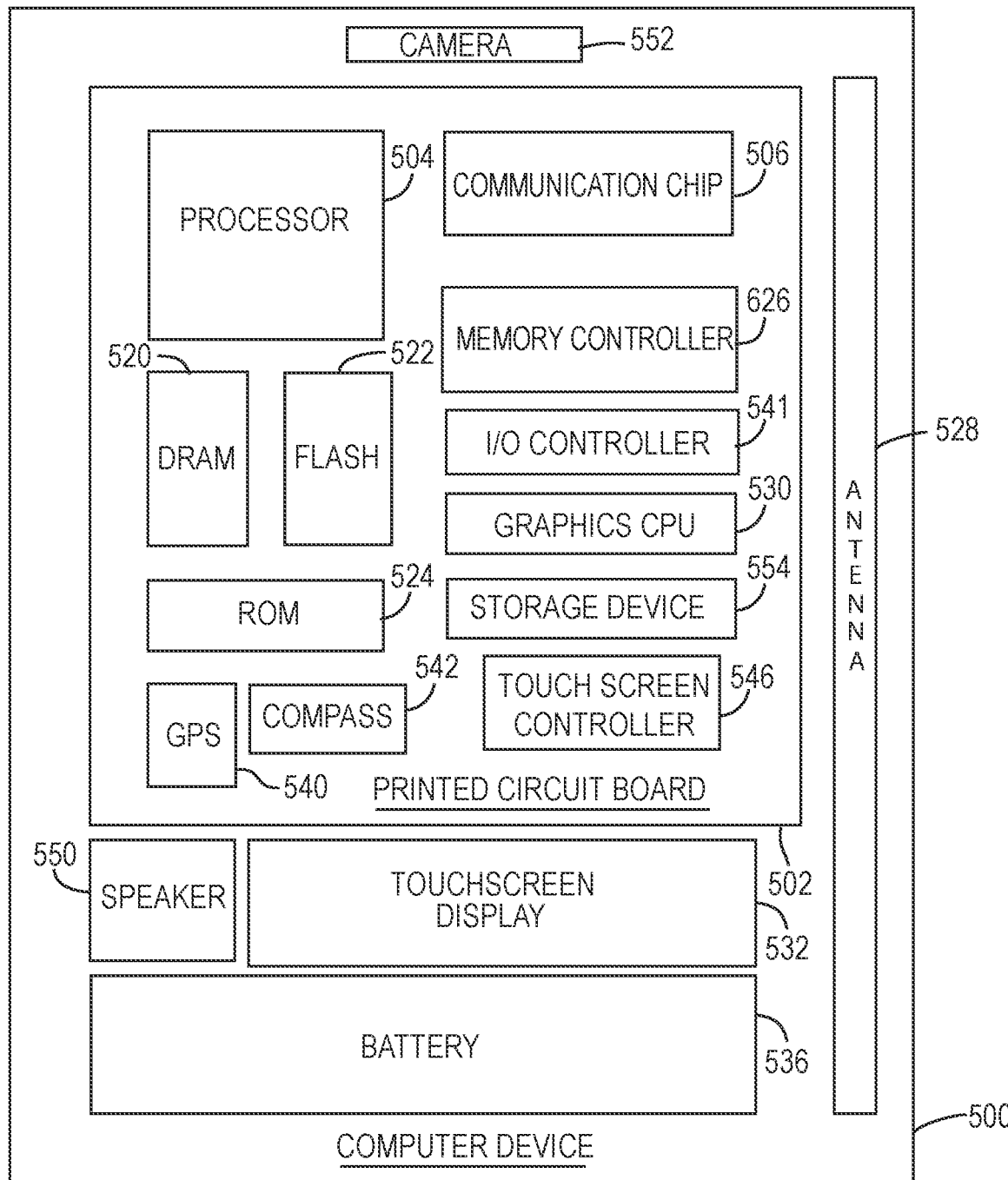
FIG. 23 is a block diagram of an example computer that can be used to implement some or all of the components of the system or methods disclosed herein, according to various embodiments.

FIG. 23 illustrates an example computer device 500 that may employ or be used to implement, in whole or in part, the apparatuses and/or methods described herein (e.g., control system 120, ECU 125, and vehicle systems manager 140), in accordance with various embodiments. As shown, computer device 500 may include a number of components, such as one or more processor(s) 504 (one shown) and at least one communication chip 506. In various embodiments, the one or more processor(s) 504 each may include one or more processor cores. In various embodiments, the one or more processor(s) 504 may include hardware accelerators to complement the one or more processor cores. In various embodiments, the at least one communication chip 506 may be physically and electrically coupled to the one or more processor(s) 504. In further implementations, the communication chip 506 may be part of the one or more processor(s) 504. In various embodiments, computer device 500 may include printed circuit board (PCB) 502. For these embodiments, the one or more processor(s) 504 and communication chip 506 may be disposed thereon. In alternate embodiments, the various components may be coupled without the employment of PCB 502.

Depending on its applications, computer device 500 may include other components that may be physically and electrically coupled to the PCB 502. These other components may include, but are not limited to, memory controller 526, volatile memory (e.g., dynamic random access memory (DRAM) 520), non-volatile memory such as read only memory (ROM) 524, flash memory 522, storage device 554 (e.g., a hard-disk drive (HDD)), an I/O controller 541, a digital signal processor (not shown), a crypto processor (not shown), a graphics processor 530, one or more antennae 528, a display (not shown), a touch screen display 532, a touch screen controller 546, a battery 536, an audio codec (not shown), a video codec (not shown), a global positioning system (GPS) device 540, a compass 542, an accelerometer (not shown), a gyroscope (not shown), a speaker 550, a camera 552, and a mass storage device (such as hard disk drive, a solid state drive, compact disk (CD), digital versatile disk (DVD)) (not shown), and so forth.

In some embodiments, the one or more processor(s) 504, flash memory 522, and/or storage device 554 may include associated firmware (not shown) storing programming instructions configured to enable computer device 500, in response to execution of the programming instructions by one or more processor(s) 504, to practice all or selected aspects of the object detection enhancement methods described herein. In various embodiments, these aspects may additionally or alternatively be implemented using hardware separate from the one or more processor(s) 504, flash memory 522, or storage device 554.

The communication chips 506 may enable wired and/or wireless communications for the transfer of data to and from the computer device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to Wi-Fi, Worldwide Interoperability for Microwave Access (WiMAX), Bluetooth, derivatives thereof, Zigbee, as well as any other long-range wireless protocols that are designated as 3G, 4G, 5G, and beyond. The computer device 500 may include a plurality of communication chips 506. For instance, a first communication chip 506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others.

Communications chips 506 may be used to implement the transmitter, receiver, or transceiver components of apparatus 100, such as part of or in communication with vehicle systems manager 140 and/or control system 120.

In various implementations, the computer device 500 may be a laptop, a netbook, a notebook, an ultrabook, a smartphone, a computer tablet, a personal digital assistant (PDA), a desktop computer, or a server. In further implementations, the computer device 500 may be any other electronic device that processes data.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., computer 500, in response to execution of the programming instructions, to implement (at least aspects of) control system 120, ECU 125, vehicle systems manager 140, any other suitable portion or component disclosed herein, as well as some portions or all of the various methods disclosed herein and/or recited in the claims attached hereto. In alternate embodiments, programming instructions 604 may be disposed on multiple computer-readable non-transitory storage media 602 instead. In still other embodiments, programming instructions 604 may be disposed on computer-readable transitory storage media 602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Example Methods

Figure 25:
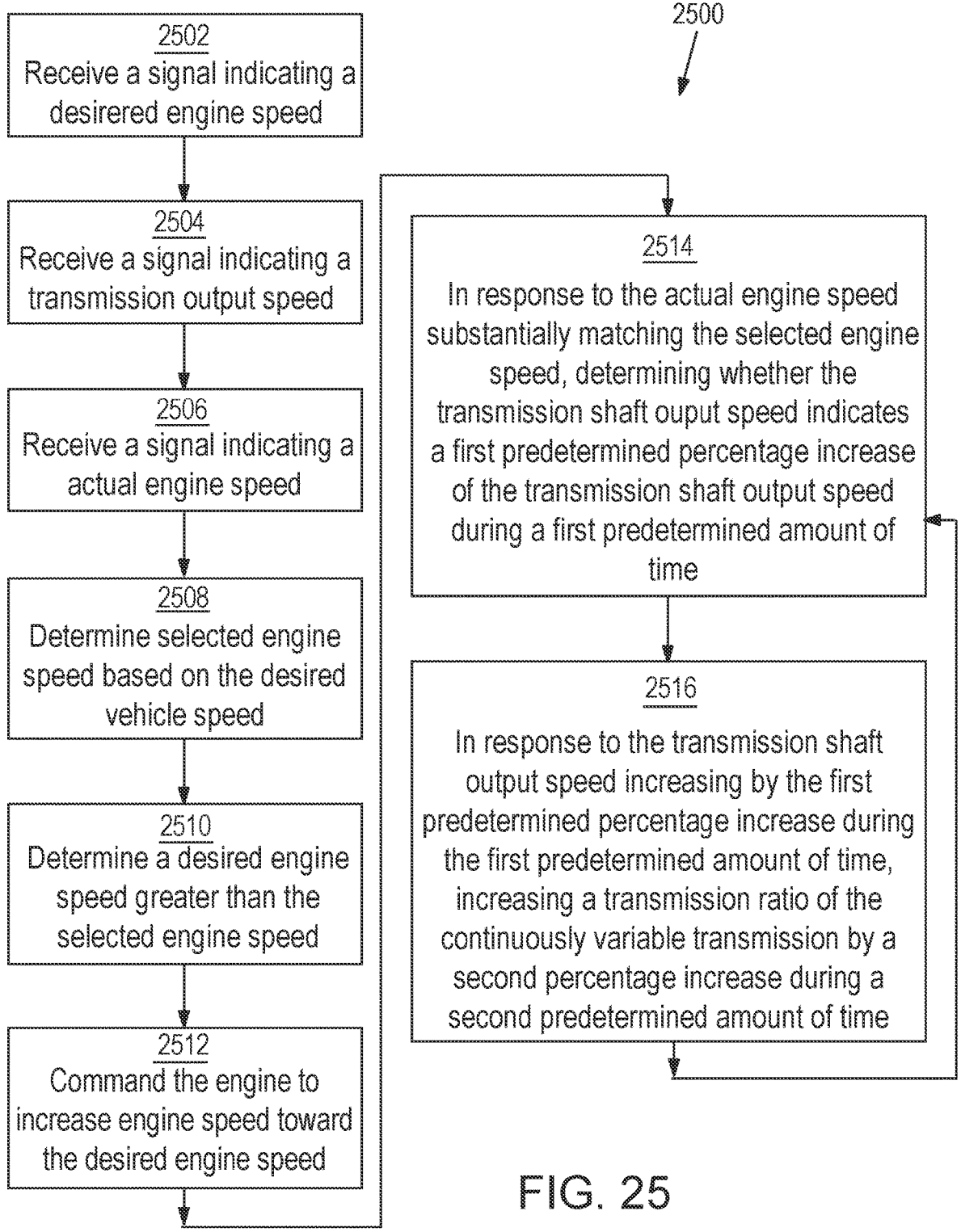
FIG. 25 is a flowchart of an example method for controlling an engine and CVT for accelerating a vehicle that may be carried out by the controller of FIG. 5, according to various embodiments.
Figure 26:
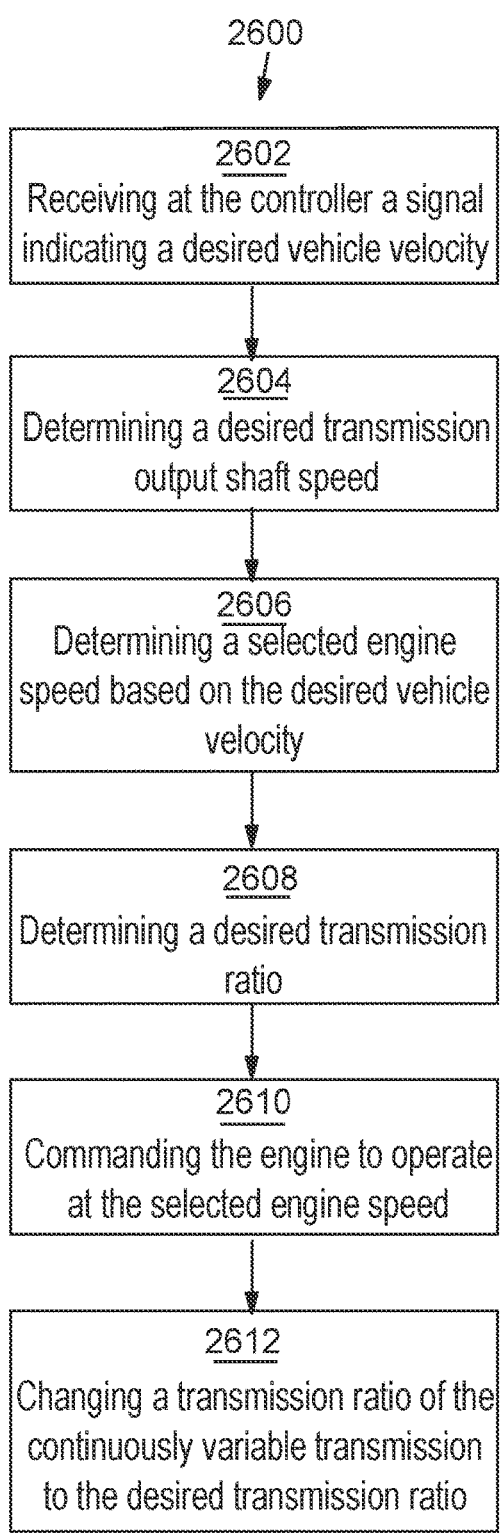
FIG. 26 is a flowchart of another example method for controlling an engine and CVT of a vehicle that may be carried out by the controller of FIG. 5, according to various embodiments.
Figure 27:
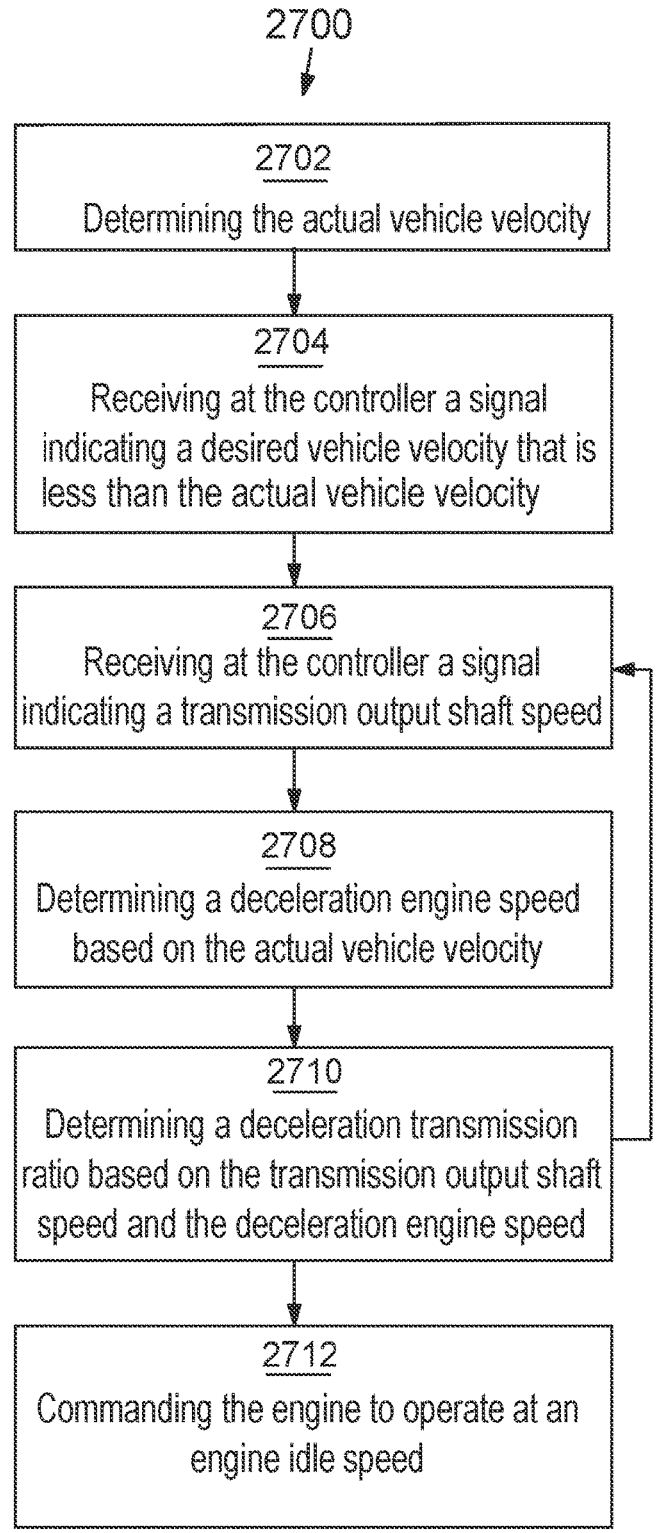
FIG. 27 is a flowchart of another example method for controlling an engine and CVT for decelerating a vehicle that may be carried out by the controller of FIG. 5, according to various embodiments.

FIGS. 25-27 illustrate the various operations of several methods that may be carried out in part or in whole by a controller such as control system 120, and in particular by vehicle systems manager 140. The various operations described below are provided in summary fashion, and the reader is directed to the foregoing discussion for specific details about how the various operations may be carried out.

FIG. 25 depicts the operations of a method 2500 that may be used with a vehicle, such as forklift 110. Method 2500 may be used for controlling acceleration of a vehicle having a continuously variable transmission mechanically connected between a driven wheel and an engine, and a controller electronically connected to the continuously variable transmission and to the engine for changing operation of the transmission and the engine. Method 2500 may include receiving, at operation 2502 at the controller, a signal indicating a desired vehicle speed. Such a signal may be received by an accelerator pedal, brake pedal, or other input. In operation 2504, a signal indicating a transmission shaft output speed may be received at the controller, and in operation 2506, a signal indicating an actual engine speed may further be received at the controller. In operation 2508, the controller may determine a selected engine speed based on the desired vehicle speed. Next, the controller may determine a desired engine speed that is greater than the selected engine speed in operation 2510, and in operation 2512, the controller may command the engine to increase engine speed toward the desired engine speed.

In operation 2514, in response to the actual engine speed substantially matching the selected engine speed, the controller may determine whether the transmission shaft output speed indicates a first predetermined percentage increase of the transmission shaft output speed during a first predetermined amount of time. Next, in operation 2516, in response to the transmission shaft output speed increasing by the first predetermined percentage increase during the first predetermined amount of time, the controller may increase a transmission ratio of the continuously variable transmission by a second percentage increase during a second predetermined amount of time. Operations 2514 and 2516 may be repeated by the controller until the transmission shaft output speed does not increase by the first predetermined percentage increase during the first predetermined amount of time. At this point, the controller may transition into a steady-state regime, as described above, and with respect to method 2600 below.

Turning to FIG. 26, a method 2600 for controlling steady state travel of a vehicle having a continuously variable transmission mechanically connected between a driven wheel and an engine, and a controller electronically connected to the continuously variable transmission and to the engine for changing operation of the transmission and the engine, is depicted. In operation 2602, the controller may receive a signal indicating a desired vehicle velocity, and in operation 2604, the controller may determine a desired transmission output shaft speed. The controller may, in operation 2606, determine a selected engine speed based on the desired vehicle velocity and, in operation 2608, the controller may determine a desired transmission ratio. In operation 2610, the controller may command the engine to operate at the selected engine speed. Finally, in operation 2612 the controller may change a transmission ratio of the continuously variable transmission to the desired transmission ratio. When the vehicle is in steady-state, it may be accelerated by switching to an acceleration regime, such as method 2500 described above, or may decelerate by switching to a deceleration regime, such as method 2700 described below.

Finally, in FIG. 27, a method 2700 for decreasing an actual vehicle velocity of a vehicle having a continuously variable transmission mechanically connected between a driven wheel and an engine, and a controller electronically connected to the continuously variable transmission and to the engine for changing operation of the transmission and the engine is described. Operation 2702 may include determining, via the controller, the actual vehicle velocity. Next, in operation 2704, the controller may receive a signal indicating a desired vehicle velocity that is less than the actual vehicle velocity, and in operation 2706, the controller may receive a signal indicating a transmission output shaft speed. In operation 2708, the controller may determine a deceleration engine speed based on the actual vehicle velocity. The controller next, in operation 2710, may determine a deceleration transmission ratio based on the transmission output shaft speed and the deceleration engine speed. Finally, in operation 2712, the controller may commanding the engine to operate at an engine idle speed. While the vehicle continues to decelerate, the controller may loop through steps (c), (d), and (e) to maintain the engine at the deceleration engine speed as the actual vehicle velocity decreases. At this point, the vehicle may exit the deceleration regime and enter either a steady-state or acceleration regime, depending upon various control inputs.

Advantages

Embodiments of the claimed invention may thus exhibit one or more advantages over existing control systems. Such advantages may include being self-tuning; that control of engine speed and transmission ratio is not forced for a given vehicle speed, instead, the control system settles on suitable values that depend on external conditions; the only feedback signals to the controller are indicative of vehicle velocity and engine speed; not needing expensive sensors to measure torque or pressure values; lesser processing power needed for the vehicle controller; the feel and performance of the vehicle may be adjusted easily because only a small number of input values need to be adjusted; and the control system responds to the demands of the driver while targeting maximum vehicle efficiency.

The foregoing is a detailed description of illustrative embodiments of the invention using specific terms and expressions. Various modifications and additions can be made without departing from the spirit and scope thereof. Therefore, the invention is not limited by the above terms and expressions, and the invention is not limited to the exact construction and operation shown and described. On the contrary, many variations and embodiments are possible and fall within the scope of the invention, which is defined only by the claims that follow.

EXAMPLES

The following examples pertain to further embodiments:

Example 1 is a method for controlling acceleration of a vehicle having a continuously variable transmission mechanically connected between a driven wheel and an engine, and a controller electronically connected to the continuously variable transmission and to the engine for changing operation of the transmission and the engine, the method comprising (a) receiving at the controller a signal indicating a desired vehicle speed; (b) receiving at the controller a signal indicating a transmission shaft output speed; (c) receiving at the controller a signal indicating an actual engine speed; (d) via the controller, determining a selected engine speed based on the desired vehicle speed; (e) via the controller, determining a desired engine speed that is greater than the selected engine speed; (f) via the controller, commanding the engine to increase engine speed toward the desired engine speed; (g) via the controller, and in response to the actual engine speed substantially matching the selected engine speed, determining whether the transmission shaft output speed indicates a first predetermined percentage increase of the transmission shaft output speed during a first predetermined amount of time; (h) via the controller, and in response to the transmission shaft output speed increasing by the first predetermined percentage increase during the first predetermined amount of time, increasing a transmission ratio of the continuously variable transmission by a second percentage increase during a second predetermined amount of time; and (i) repeating steps (g) and (h) until the transmission shaft output speed does not increase by the first predetermined percentage increase during the first predetermined amount of time.

Example 2 includes the subject matter of example 1, or some other example herein, wherein the second predetermined percentage increase is equal in value to the first predetermined percentage increase; and the second predetermined amount of time is equal in value to the first predetermined amount of time.

Example 3 includes the subject matter of example 1 or 2, or some other example herein, wherein the signal indicating a desired vehicle velocity comprises a signal generated by an accelerator device; a signal generated by a brake device; and a signal generated by a forward-neutral-reverse selector.

Example 4 includes the subject matter of any of examples 1-3, or some other example herein, wherein the controller comprises a processing device operatively connected to an engine control unit, and wherein the signal indicating a desired vehicle velocity, the signal indicating a transmission shaft output speed, and the signal indicating an actual engine speed are received by the processing device; determining a selected engine speed based on the desired vehicle speed is performed by the processing device; determining a desired engine speed that is greater than the selected engine speed is performed by the processing device; commanding the engine to increase engine speed toward the desired engine speed is performed by the engine control unit; determining whether the transmission shaft output speed indicates a first predetermined percentage increase of the transmission shaft output speed during a first predetermined amount of time is performed by the processing device; and increasing a transmission ratio of the continuously variable transmission by a second percentage increase during a second predetermined amount of time is performed by the processing device.

Example 5 includes the subject matter of any of examples 1-4, or some other example herein, wherein the continuously variable transmission comprises a hydrostatic transmission.

Example 6 is a method for controlling steady state travel of a vehicle having a continuously variable transmission mechanically connected between a driven wheel and an engine, and a controller electronically connected to the continuously variable transmission and to the engine for changing operation of the transmission and the engine, the method comprising receiving at the controller a signal indicating a desired vehicle velocity; via the controller, determining a desired transmission output shaft speed; via the controller, determining a selected engine speed based on the desired vehicle velocity; via the controller, determining a desired transmission ratio; via the controller, commanding the engine to operate at the selected engine speed; and via the controller, changing a transmission ratio of the continuously variable transmission to the desired transmission ratio.

Example 7 includes the subject matter of example 6, or some other example herein, wherein determining a desired transmission output shaft speed is based on the desired vehicle velocity and one or more of a circumference of the driven wheel and a gear ratio of a gear set positioned between the continuously variable transmission and the driven wheel.

Example 8 includes the subject matter of example 6 or 7, or some other example herein, wherein changing a transmission ratio of the continuously variable transmission to the desired transmission ratio comprises via the controller, changing the transmission ratio of the continuously variable transmission; receiving at the controller a signal indicating an actual engine speed; receiving at the controller a signal indicating a transmission output shaft speed; via the controller, determining an actual value of the transmission ratio of the continuously variable transmission based on the actual engine speed and the transmission output shaft speed; via the controller, comparing the actual value of the transmission ratio of the continuously variable transmission to the desired transmission ratio; and via the controller, if the actual value of the transmission ratio of the continuously variable transmission is less than the desired transmission ratio, determining a compensation value to add to the desired transmission ratio to create a new desired transmission ratio and changing the transmission ratio of the continuously variable transmission based on the new desired transmission ratio.

Example 9 includes the subject matter of any of examples 6-8, or some other example herein, wherein the continuously variable transmission comprises a hydrostatic transmission.

Example 10 includes the subject matter of example 9, or some other example herein, wherein changing a transmission ratio of the continuously variable transmission to the desired transmission ratio comprises via the controller, changing a ratio of pump displacement to motor displacement for the hydrostatic transmission to change the transmission ratio of the hydrostatic transmission; receiving at the controller a signal indicating an actual engine speed; receiving at the controller a signal indicating a transmission output shaft speed; via the controller, determining an actual value of the transmission ratio of the hydrostatic transmission based on the actual engine speed and the transmission output shaft speed; via the controller, comparing the actual value of the transmission ratio of the hydrostatic transmission to the desired transmission ratio; and via the controller, if the actual value of the transmission ratio of the hydrostatic transmission is less than the desired transmission ratio, determining a compensation value to add to the desired transmission ratio to create a new desired transmission ratio and changing the ratio of pump displacement to motor displacement for the hydrostatic transmission to change the transmission ratio of the hydrostatic transmission based on the new desired transmission ratio.

Example 11 is a method for decreasing an actual vehicle velocity of a vehicle having a continuously variable transmission mechanically connected between a driven wheel and an engine, and a controller electronically connected to the continuously variable transmission and to the engine for changing operation of the transmission and the engine, the method comprising (a) via the controller, determining the actual vehicle velocity; (b) receiving at the controller a signal indicating a desired vehicle velocity that is less than the actual vehicle velocity; (c) receiving at the controller a signal indicating a transmission output shaft speed; (d) via the controller, determining a deceleration engine speed based on the actual vehicle velocity; (e) via the controller, determining a deceleration transmission ratio based on the transmission output shaft speed and the deceleration engine speed; (f) via the controller, commanding the engine to operate at an engine idle speed; and (g) via the controller, looping through steps (c), (d), and (e) to maintain the engine at the deceleration engine speed as the actual vehicle velocity decreases.

Example 12 includes the subject matter of example 11, or some other example herein, wherein the deceleration engine speed determined in (d) decreases as the actual vehicle velocity decreases.

Example 13 is a method for controlling acceleration, steady state travel, and deceleration of a vehicle having a continuously variable transmission mechanically connected between a driven wheel and an engine, and a controller electronically connected to the continuously variable transmission and to the engine for changing operation of the transmission and the engine, the controller programmed with an acceleration module, a steady state module, and a deceleration module, the method comprising receiving at the controller a signal indicating a desired vehicle velocity; via the controller, determining a desired engine speed for acceleration (dRPMAccel) and a desired transmission ratio for acceleration (dTRAccel) based on the desired vehicle velocity; via the controller, determining a desired engine speed for steady state (dRPMSS) and a desired transmission ratio for steady state (dTRSS) based on the desired vehicle velocity; via the controller, determining a desired engine speed for deceleration (dRPMDecel) and a desired transmission ratio for deceleration (dTRDecel) based on the desired vehicle velocity; via the controller, determining an actual vehicle velocity; via the controller, determining a control coefficient ($\lambda$) based on the actual vehicle velocity and the desired vehicle velocity; via the controller, determining an acceleration gain ($\alpha$), a steady state gain ($\beta$), and a deceleration gain ($\gamma$) based on the $\lambda$; via the controller, determining a desired engine speed (dRPMDrive) based on (i) applying the $\alpha$ to the dRPMAccel, (ii) applying the $\beta$ to the dRPMSS, and (iii) applying the $\gamma$ to the dRPMDecel; via the controller, determining a desired transmission ratio (dTRDrive) based on (i) applying the $\alpha$ to the dTRAccel, (ii) applying the $\beta$ to the dTRSS, and (iii) applying the $\gamma$ to the dTRDecel; via the controller, commanding the engine to operate at the dRPMDrive; and via the controller, changing the transmission ratio of the continuously variable transmission to the dTRDrive.

Example 14 includes the subject matter of example 13, or some other example herein, wherein the $\lambda$ is determined by dividing the actual vehicle velocity by the desired vehicle velocity, and the $\lambda$ is limited to values that are greater than or equal to 0 and less than or equal to 2.

Example 15 includes the subject matter of example 13 or 14, or some other example herein, wherein the $\alpha$ is limited to values that are greater than or equal to 0 and less than or equal to 1; the $\beta$ is limited to values that are greater than or equal to 0 and less than or equal to 1; and the $\gamma$ is limited to values that are greater than or equal to 0 and less than or equal to 1.

Example 16 includes the subject matter of any of examples 13-15, or some other example herein, wherein the controller determines that the $\alpha$ equals 1 when the $\lambda$ is greater than or equal to 0 and less than or equal to 0.6, that the $\alpha$ decreases from 1 to 0 as the $\lambda$ changes from greater than or equal to 0.6 to less than or equal to 1.0, and that the $\alpha$ equals 0 when the $\lambda$ is greater than or equal to 1.0 and less than or equal to 2; the controller determines that the $\beta$ equals 0 when (i) the $\lambda$ is greater than or equal to 0 and less than or equal to 0.6 or (ii) the $\lambda$ is greater than or equal to 1.4 and less than or equal to 2, that the $\beta$ increases from 0 to 1 as the $\lambda$ changes from greater than or equal to 0.6 to less than or equal to 1.0, and that the $\beta$ decreases from 1 to 0 as the $\lambda$ changes from greater than or equal to 1 to less than or equal to 1.4; and the controller determines that the $\gamma$ equals 0 when the $\lambda$ is greater than or equal to 0 and less than or equal to 1, that the $\gamma$ increases from 0 to 1 as the $\lambda$ changes from greater than or equal to 1 to less than or equal to 1.4, and that the $\gamma$ equals 1 when the $\lambda$ is greater than or equal to 1.4 and less than or equal to 2.

Example 17 includes the subject matter of any of examples 13-16, or some other example herein, wherein the controller determines the dRPMDrive using the formula dRPMDrive=($\alpha \times$dRPMAccel)+($\beta \times$dRPMSS)+($\gamma \times$dRPMDecel).

Example 18 includes the subject matter of any of examples 13-17, or some other example herein, wherein the controller determines the dTRDrive using the formula dTRDrive=($\alpha \times$dTRAccel)+($\beta \times$dTRSS)+($\beta \times$dTRDecel).

Example 19 is a method for controlling a vehicle equipped with an engine coupled to a continuously variable transmission (CVT), comprising determining, based upon a commanded vehicle speed, a selected engine speed; determining, when the commanded vehicle speed is greater than a current vehicle speed, a target engine speed greater than the selected engine speed; commanding, when a target engine speed has been determined, the engine towards the target engine speed; and adjusting repeatedly, before the vehicle reaches the commanded vehicle speed, a drive ratio for the CVT that will maintain the engine at approximately the selected engine speed or, when the commanded vehicle speed is less than the current vehicle speed, at a braking engine speed.

Example 20 includes the subject matter of example 19, or some other example herein, further comprising determining a gain value by dividing the current vehicle speed with the commanded vehicle speed; adjusting repeatedly, when the gain value is less than one and above a first predetermined threshold that is less than one, the target engine speed towards the selected engine speed as the gain value approaches one; and adjusting repeatedly, when the gain value is greater than one and the gain value is below a second predetermined threshold that is greater than one, the braking engine speed towards the selected engine speed as the gain value approaches one.

Example 21 includes the subject matter of example 19 or 20, or some other example herein, wherein commanding the engine towards the target engine speed comprises providing the target engine speed to an engine control unit.

Example 22 includes the subject matter of any of examples 19-21, or some other example herein, further comprising determining the commanded vehicle speed from at least one sensor, the sensor coupled to sense the position of an accelerator or brake control on a vehicle.

Example 23 includes the subject matter of any of examples 19-22, or some other example herein, further comprising determining the current vehicle speed from at least one sensor, the sensor coupled to an output shaft from the CVT.

Example 24 includes the subject matter of any of examples 19-23, or some other example herein, wherein determining the selected engine speed further comprises determining the selected engine speed based upon power requirements of a hoist mechanism.

Example 25 includes the subject matter of any of examples 19-24, or some other example herein, wherein determining the target engine speed further comprises determining the target engine speed to optimize the fuel efficiency of the engine.

Example 26 is a non-transitory computer readable medium (CRM) comprising instructions that, when executed by a processor of a vehicle systems manager for a vehicle, cause the manager to select, based upon a commanded vehicle speed, a selected engine speed; determine, when the commanded vehicle speed is greater than a current vehicle speed, a target engine speed greater than the selected engine speed; control an engine towards the target engine speed when a target engine speed has been determined; and adjust repeatedly, before the vehicle reaches the commanded vehicle speed, a drive ratio for the continuously variable transmission (CVT) that will maintain approximately the selected engine speed or, when the commanded vehicle speed is less than the current vehicle speed, maintain approximately a braking engine speed, the CVT mechanically coupled to the engine, wherein the target engine speed and drive ratio are selected to optimize engine fuel efficiency while providing a torque level sufficient to achieve the commanded vehicle speed and provide power to actuate a hoist mechanism.

Example 27 includes the subject matter of example 26, or some other example herein, wherein the instructions are to further cause the vehicle systems manager to determine a gain value by dividing the current vehicle speed with the commanded vehicle speed; adjust repeatedly, when the gain value is less than one and above a first predetermined threshold that is less than one, the target engine speed towards the selected engine speed as the gain value approaches one; and adjust repeatedly, when the gain value is greater than one and the gain value is below a second predetermined threshold that is greater than one, the braking engine speed towards the selected engine speed as the gain value approaches one.

Example 28 includes the subject matter of example 26 or 27, or some other example herein, wherein the instructions are to further cause the vehicle systems manager to provide the target engine speed to an engine control unit to command the engine towards the target engine speed.

Example 29 includes the subject matter of any of examples 26-28, or some other example herein, wherein the instructions are to further cause the vehicle systems manager to determine the commanded vehicle speed from at least one sensor, the sensor coupled to sense the position of an accelerator or brake control on a vehicle.

Example 30 includes the subject matter of any of examples 26-29, or some other example herein, wherein the instructions are to further cause the vehicle systems manager to determine the current vehicle speed from at least one sensor, the sensor coupled to an output shaft from the CVT.

Example 31 includes the subject matter of any of examples 26-30, or some other example herein, wherein the instructions are to further cause the vehicle systems manager to determine the selected engine speed based upon power requirements of a hoist mechanism.

Example 32 includes the subject matter of any of examples 26-31, or some other example herein, wherein the instructions are to further cause the vehicle systems manager to determine the target engine speed to optimize the fuel efficiency of the engine.

Example 33 is an apparatus for controlling a vehicle powered by an engine coupled to a continuously variable transmission (CVT), comprising an engine speed determiner to determine, based upon a commanded vehicle speed, a selected engine speed and, where the commanded vehicle speed is greater than a current vehicle speed, a target engine speed greater than the selected engine speed; a CVT ratio determiner to repeatedly calculate a drive ratio for the CVT that will maintain approximately the selected engine speed or, when the commanded vehicle speed is less than the current vehicle speed, maintain approximately a braking engine speed; and a vehicle systems controller coupled to the engine speed determiner and CVT ratio determiner to cause, when the commanded vehicle speed is greater than a current vehicle speed, the engine to be controlled towards the target engine speed; and control, before the vehicle reaches the commanded vehicle speed, the CVT to the repeatedly calculated drive ratio.

Example 34 includes the subject matter of example 33, or some other example herein, wherein the vehicle systems controller is further to determine a gain value by dividing the current vehicle speed with the commanded vehicle speed; the engine speed determiner is further to adjust repeatedly, when the gain value is less than one and above a first predetermined threshold that is less than one, the target engine speed towards the selected engine speed as the gain value approaches one; and the CVT ratio determiner is further to calculate repeatedly, when the gain value is greater than one and the gain value is below a second predetermined threshold that is greater than one, the drive ratio to decrease the braking engine speed towards the selected engine speed as the gain value approaches one.

Example 35 includes the subject matter of example 33 or 34, or some other example herein, wherein the apparatus further comprises an engine control unit to control the engine speed.

Example 36 includes the subject matter of any of examples 33-35, or some other example herein, wherein the CVT comprises a hydro-static transmission.

Example 37 includes the subject matter of any of examples 33-36, or some other example herein, wherein the apparatus is part of a forklift.

Example 38 includes the subject matter of example 37, wherein the forklift further comprises a hoist mechanism powered from the engine.

Example 39 includes the subject matter of example 38, wherein the engine speed determiner is further to determine the selected engine speed based upon power requirements of the hoist mechanism.

What is claimed is:

1. A method for controlling a vehicle equipped with an engine coupled to a continuously variable transmission (CVT) with a controllable drive ratio, comprising:
   via a processor on the vehicle, monitoring a current engine speed;
   via the processor on the vehicle, monitoring a transmission output speed;
   via the processor on the vehicle and based upon a commanded vehicle speed being greater than a current vehicle speed, executing an acceleration process comprising:
      determining an acceleration engine speed based on the commanded vehicle speed;
      determining a target engine speed that is greater than the acceleration engine speed;
      commanding the engine to operate at the target engine speed;
      iteratively determining, each time a predetermined amount of time elapses, whether the transmission output speed has changed compared to the transmission output speed at the end of the previous iteration, and, in response to the transmission output speed having changed, determining a new acceleration drive ratio for the CVT, wherein the new acceleration drive ratio facilitates the engine operating at the acceleration engine speed; and
      iteratively changing the CVT to the new acceleration drive ratio.

2. The method of claim 1, further comprising:
   via the processor on the vehicle and based upon a commanded vehicle speed being less than a current vehicle speed, executing a deceleration process comprising:
      determining a braking engine speed; and
      iteratively determining, each time the predetermined amount of time elapses, whether the transmission output speed has changed, and, in response to the transmission output speed having changed, determining a new deceleration drive ratio for the CVT to facilitate the engine operating at the braking engine speed; and
      iteratively changing the CVT to the new deceleration drive ratio.

3. The method of claim 1, further comprising:
   via the processor on the vehicle and based upon a commanded vehicle speed being equal to a current vehicle speed, executing a steady state process comprising:

determining a steady state engine speed based on the commanded vehicle speed, wherein the steady state engine speed minimizes engine speed and maximizes engine torque;
determining a steady state transmission output speed based on the commanded vehicle speed;
determining a steady state drive ratio for the CVT that is based on the steady state engine speed and the steady state transmission output speed;
changing the engine speed to the steady state engine speed; and
changing the CVT to the steady state drive ratio.

4. The method of claim 2, further comprising:
via the processor on the vehicle and based upon a commanded vehicle speed being equal to a current vehicle speed, executing a steady state process comprising:
determining a steady state engine speed based on the commanded vehicle speed, wherein the steady state engine speed minimizes engine speed and maximizes engine torque;
determining a steady state transmission output speed based on the commanded vehicle speed;
determining a steady state drive ratio for the CVT that is based on the steady state engine speed and the steady state transmission output speed;
changing the engine speed to the steady state engine speed; and
changing the CVT to the steady state drive ratio.

5. The method of claim 4, further comprising executing, via the processor on the vehicle, the acceleration process, the deceleration process, and the steady state process simultaneously by:
determining a control coefficient by dividing the current vehicle speed by the commanded vehicle speed, wherein the control coefficient is limited to values that are greater than or equal to 0 and less than or equal to 2;
determining an acceleration gain value based on the control coefficient, wherein the acceleration gain value is limited to values that are greater than or equal to 0 and less than or equal to 1;
determining a deceleration gain value based on the control coefficient, wherein the deceleration gain value is limited to values that are greater than or equal to 0 and less than or equal to 1;
determining a steady state gain value based on the control coefficient, wherein the steady state gain value is limited to values that are greater than or equal to 0 and less than or equal to 1;
wherein the acceleration gain value plus the deceleration gain value plus the steady state gain value equals 1;
determining a desired engine speed by adding the results of (i) multiplying the acceleration engine speed by the acceleration gain value, (ii) multiplying the braking engine speed by the deceleration gain value, and (iii) multiplying the steady state engine speed by the steady state gain value;
determining a desired transmission ratio by adding the results of (i) multiplying the acceleration drive ratio by the acceleration gain value, (ii) multiplying the deceleration drive ratio by the deceleration gain value, and (iii) multiplying the steady state drive ratio by the steady state gain value;
changing the engine speed to the desired engine speed; and
changing the drive ratio for the CVT to the desired transmission drive ratio.

6. The method of claim 5, wherein:
the controller on the vehicle determines that the acceleration gain value equals 1 when the control coefficient is greater than or equal to 0 and less than or equal to 0.6, that the acceleration gain value decreases from 1 to 0 as the control coefficient changes from greater than 0.6 to less than or equal to 1.0, and that the acceleration gain value equals 0 when the control coefficient is greater than 1.0 and less than or equal to 2.0;
the controller on the vehicle determines that the steady state gain value equals 0 when the control coefficient is greater than or equal to 0 and less than or equal to 0.6, that the steady state gain value increases from 0 to 1 as the control coefficient changes from greater than 0.6 to less than or equal to 1, that the steady state gain value decreases from 1 to 0 as the control coefficient changes from greater than 1 to less than or equal to 1.4, and that the steady state gain value equals 0 when the control coefficient is greater than 1.4 and less than or equal to 2.0; and
the controller on the vehicle determines that the deceleration gain value equals 0 when the control coefficient is greater than or equal to 0 and less than or equal to 1, that the deceleration gain value increases from 0 to 1 as the control coefficient changes from greater than 1 to less than or equal to 1.4, and that the deceleration gain value equals 1 when the control coefficient is greater than 1.4 and less than or equal to 2.0.

7. The method of claim 4, further comprising:
via the controller on the vehicle, determining an operative engine speed based upon power requirements of a hoist mechanism;
via the controller on the vehicle, changing the engine speed from whichever of the acceleration engine speed, braking engine speed, or steady state engine speed at which the engine had been operating to the operative engine speed; and
via the controller on the vehicle, controlling the drive ratio for the CVT such that the vehicle operates at the commanded vehicle speed regardless of an increase of the engine speed above whichever of the acceleration engine speed, braking engine speed, or steady state engine speed at which the engine had been operating.

8. A non-transitory computer readable medium (CRM) comprising instructions that, when executed by a processor of a vehicle systems manager, cause the vehicle systems manager to:
monitor a current engine speed;
monitor a transmission output speed;
based upon a commanded vehicle speed being greater than a current vehicle speed, execute an acceleration program causing the processor of the vehicle system manager to:
determine an acceleration engine speed based on the commanded vehicle speed;
determine a target engine speed that is greater than the acceleration engine speed;
command the engine to operate at the target engine speed;
iteratively determine, for each time a predetermined amount of time elapses, whether the transmission output speed has changed compared to the transmission output speed at the end of the previous iteration, and, in response to the transmission output speed having changed, determine a new acceleration drive ratio for the CVT, wherein the new acceleration drive ratio is decreased compared to the previous acceleration drive ratio to facilitate the engine operating at the acceleration engine speed if the current engine speed is less than the acceleration engine speed, or wherein the new acceleration drive ratio is increased compared to the previous acceleration drive ratio to facilitate the engine operating at the acceleration engine speed if the current engine speed is greater than the acceleration engine speed; and iteratively change the CVT to the new acceleration drive ratio.

9. The CRM of claim 8, wherein the instructions are further configured, when executed by the processor of the vehicle systems manager, cause the vehicle systems manager to:

based upon a commanded vehicle speed being less than a current vehicle speed, execute a deceleration program causing the processor of the vehicle system manager to:
determine a braking engine speed; and
iteratively determine, for each time the predetermined amount of time elapses, whether the transmission output speed has changed, and, in response to the transmission output speed having changed, determine a new deceleration drive ratio for the CVT to facilitate the engine operating at the braking engine speed; and iteratively change the CVT to the new deceleration drive ratio.

10. The CRM of claim 9, wherein the instructions are further configured, when executed by the processor of the vehicle systems manager, cause the vehicle systems manager to:

based upon a commanded vehicle speed being equal to a current vehicle speed, execute a steady state program causing the processor of the vehicle system manager to:
determine a steady state engine speed based on the commanded vehicle speed, wherein the steady state engine speed minimizes engine speed and maximizes engine torque;
determine a steady state transmission output speed based on the commanded vehicle speed;
determine a steady state drive ratio for the CVT that is based on the steady state engine speed and the steady state transmission output speed;
change the engine speed to the steady state engine speed; and
change the CVT to the steady state drive ratio.

11. The CRM of claim 10, wherein the instructions are further configured, when executed by the processor of the vehicle systems manager, cause the vehicle systems manager to:

execute the acceleration process, the deceleration process, and the steady state process simultaneously by:
determining a control coefficient by dividing the current vehicle speed by the commanded vehicle speed, wherein the control coefficient is limited to values that are greater than or equal to 0 and less than or equal to 2;
determining an acceleration gain value based on the control coefficient, wherein the acceleration gain value is limited to values that are greater than or equal to 0 and less than or equal to 1;
determining a deceleration gain value based on the control coefficient, wherein the deceleration gain value is limited to values that are greater than or equal to 0 and less than or equal to 1;
determining a steady state gain value based on the control coefficient, wherein the steady state gain value is limited to values that are greater than or equal to 0 and less than or equal to 1;
wherein the acceleration gain value plus the deceleration gain value plus the steady state gain value equals 1;
determining a desired engine speed by adding the results of (i) multiplying the acceleration engine speed by the acceleration gain value, (ii) multiplying the braking engine speed by the deceleration gain value, and (iii) multiplying the steady state engine speed by the steady state gain value;
determining a desired transmission ratio by adding the results of (i) multiplying the acceleration drive ratio by the acceleration gain value, (ii) multiplying the deceleration drive ratio by the deceleration gain value, and (iii) multiplying the steady state drive ratio by the steady state gain value;
changing the engine speed to the desired engine speed; and
changing the drive ratio for the CVT to the desired transmission drive ratio.

12. The CRM of claim 11, wherein the instructions are further configured, when executed by the processor of the vehicle systems manager, cause the vehicle systems manager to:

determine that the acceleration gain value equals 1 when the control coefficient is greater than or equal to 0 and less than or equal to 0.6, that the acceleration gain value decreases from 1 to 0 as the control coefficient changes from greater than 0.6 to less than or equal to 1.0, and that the acceleration gain value equals 0 when the control coefficient is greater than 1.0 and less than or equal to 2.0;
determine that the steady state gain value equals 0 when the control coefficient is greater than or equal to 0 and less than or equal to 0.6, that the steady state gain value increases from 0 to 1 as the control coefficient changes from greater than 0.6 to less than or equal to 1, that the steady state gain value decreases from 1 to 0 as the control coefficient changes from greater than 1 to less than or equal to 1.4, and that the steady state gain value equals 0 when the control coefficient is greater than 1.4 and less than or equal to 2.0; and
determine that the deceleration gain value equals 0 when the control coefficient is greater than or equal to 0 and less than or equal to 1, that the deceleration gain value increases from 0 to 1 as the control coefficient changes from greater than 1 to less than or equal to 1.4, and that the deceleration gain value equals 1 when the control coefficient is greater than 1.4 and less than or equal to 2.0.

13. The CRM of claim 12, wherein the instructions are further configured, when executed by the processor of the vehicle systems manager, cause the vehicle systems manager to:

determine an operative engine speed based upon power requirements of a hoist mechanism;
change the engine speed from whichever of the acceleration engine speed, braking engine speed, or steady state engine speed at which the engine had been operating to the operative engine speed; and
control the drive ratio for the CVT such that the vehicle operates at the commanded vehicle speed regardless of an increase of the engine speed above whichever of the acceleration engine speed, braking engine speed, or steady state engine speed at which the engine had been operating.

14. A system for controlling a vehicle powered by an engine coupled to a continuously variable transmission (CVT), comprising:
a processor operatively coupled to an engine speed source, operatively coupled to a transmission output shaft speed source, operatively coupled to an electronic engine speed control actuator, and operatively coupled to an electronic transmission ratio control actuator;
wherein the processor is configured to receive a commanded vehicle speed;
wherein the processor is configured to either receive or determine a current vehicle speed;
wherein the processor is configured to either receive an engine speed from the engine speed source or to determine the engine speed based on the engine speed source;
wherein the processor is configured to either receive a transmission output shaft speed from the transmission output shaft speed source or to determine the transmission output shaft speed based on the transmission output shaft speed source;
wherein the processor is programmed to accelerate the vehicle, based upon the commanded vehicle speed being greater than the current vehicle speed, by:
determining an acceleration engine speed and a target engine speed that is greater than the acceleration engine speed;
causing the electronic engine speed control actuator to command the engine to operate at the target engine speed;
determine a target drive ratio for the CVT based on the engine speed and the transmission output shaft speed to cause the engine to operate at the selected engine speed;
causing the electronic transmission ratio control actuator to operate the CVT at the target drive ratio; and
at a predetermined time interval, repeatedly redetermining the target drive ratio in response to the transmission output shaft speed changing, and causing the electronic transmission ratio control actuator to operate the CVT at the redetermined target drive ratio to cause the engine to operate at the selected engine speed.

15. The apparatus of claim 14, wherein redetermining the target drive ratio comprises lowering the target drive ratio when the engine speed is less than the selected engine speed or increasing the target drive ratio when the engine speed is greater than the selected engine speed.

16. The apparatus of claim 14, wherein:
the processor is further programmed to maintain a steady state speed for the vehicle, based upon the commanded vehicle speed being equal to the current vehicle speed, by:
determining a steady state engine speed based on the commanded vehicle speed, wherein the steady state engine speed minimizes engine speed and maximizes engine torque;
determining a steady state transmission output speed based on the commanded vehicle speed;
determining a steady state drive ratio for the CVT that is based on the steady state engine speed and the steady state transmission output speed;
causing the electronic engine speed control actuator to command the engine to operate at the steady state engine speed; and
causing the electronic transmission ratio control actuator to operate the CVT at the steady state drive ratio; and wherein
the processor is further programmed to decelerate the vehicle, based upon the commanded vehicle speed being less than the current vehicle speed, by:
determining a braking engine speed; and
iteratively determining, each time the predetermined amount of time elapses, whether the transmission output speed has changed, and, in response to the transmission output speed having changed, determining a new deceleration drive ratio for the CVT to facilitate the engine operating at the braking engine speed; and
iteratively causing the electronic transmission ratio control actuator to operate the CVT at the new deceleration drive ratio.

17. The apparatus of claim 16, wherein the processor is further programmed to simultaneously perform a weighted implementation of vehicle acceleration, steady state speed, and deceleration by:
determining a control coefficient by dividing the current vehicle speed by the commanded vehicle speed, wherein the control coefficient is limited to values that are greater than or equal to 0 and less than or equal to 2;
determining an acceleration gain value based on the control coefficient, wherein the acceleration gain value is limited to values that are greater than or equal to 0 and less than or equal to 1;
determining a deceleration gain value based on the control coefficient, wherein the deceleration gain value is limited to values that are greater than or equal to 0 and less than or equal to 1;
determining a steady state gain value based on the control coefficient, wherein the steady state gain value is limited to values that are greater than or equal to 0 and less than or equal to 1;
wherein the acceleration gain value plus the deceleration gain value plus the steady state gain value equals 1;
determining a desired engine speed by adding the results of (i) multiplying the acceleration engine speed by the acceleration gain value, (ii) multiplying the braking engine speed by the deceleration gain value, and (iii) multiplying the steady state engine speed by the steady state gain value;
determining a desired transmission ratio by adding the results of (i) multiplying the acceleration drive ratio by the acceleration gain value, (ii) multiplying the deceleration drive ratio by the deceleration gain value, and (iii) multiplying the steady state drive ratio by the steady state gain value;
causing the electronic engine speed control actuator to command the engine to operate at the desired engine speed; and
causing the electronic transmission ratio control actuator to operate the CVT at the desired transmission drive ratio.

18. The apparatus of claim 17, wherein the processor is further programmed to:
determine that the acceleration gain value equals 1 when the control coefficient is greater than or equal to 0 and less than or equal to 0.6, that the acceleration gain value decreases from 1 to 0 as the control coefficient changes from greater than 0.6 to less than or equal to 1.0, and that the acceleration gain value equals 0 when the control coefficient is greater than 1.0 and less than or equal to 2.0;

determine that the steady state gain value equals 0 when the control coefficient is greater than or equal to 0 and less than or equal to 0.6, that the steady state gain value increases from 0 to 1 as the control coefficient changes from greater than 0.6 to less than or equal to 1, that the steady state gain value decreases from 1 to 0 as the control coefficient changes from greater than 1 to less than or equal to 1.4, and that the steady state gain value equals 0 when the control coefficient is greater than 1.4 and less than or equal to 2.0; and determine that the deceleration gain value equals 0 when the control coefficient is greater than or equal to 0 and less than or equal to 1, that the deceleration gain value increases from 0 to 1 as the control coefficient changes from greater than 1 to less than or equal to 1.4, and that the deceleration gain value equals 1 when the control coefficient is greater than 1.4 and less than or equal to 2.0.

19. The apparatus of claim 17, wherein the processor is further programmed to:

determine an operative engine speed based upon power requirements of a hoist mechanism;

cause the electronic engine speed control actuator to command the engine to operate at the operative engine speed; and cause the electronic transmission ratio control actuator to change the drive ratio of the CVT such that the vehicle operates at the commanded vehicle speed regardless of the change of the engine speed to the operative engine speed.

* * * * *

UNITED STATES PATENT AND TRADEMARK OFFICE
CERTIFICATE OF CORRECTION

PATENT NO. : 11,193,583 B2
APPLICATION NO. : 16/759977
DATED : December 7, 2021
INVENTOR(S) : Bradley et al.

It is certified that error appears in the above-identified patent and that said Letters Patent is hereby corrected as shown below:

In the Drawings

Figure 22:
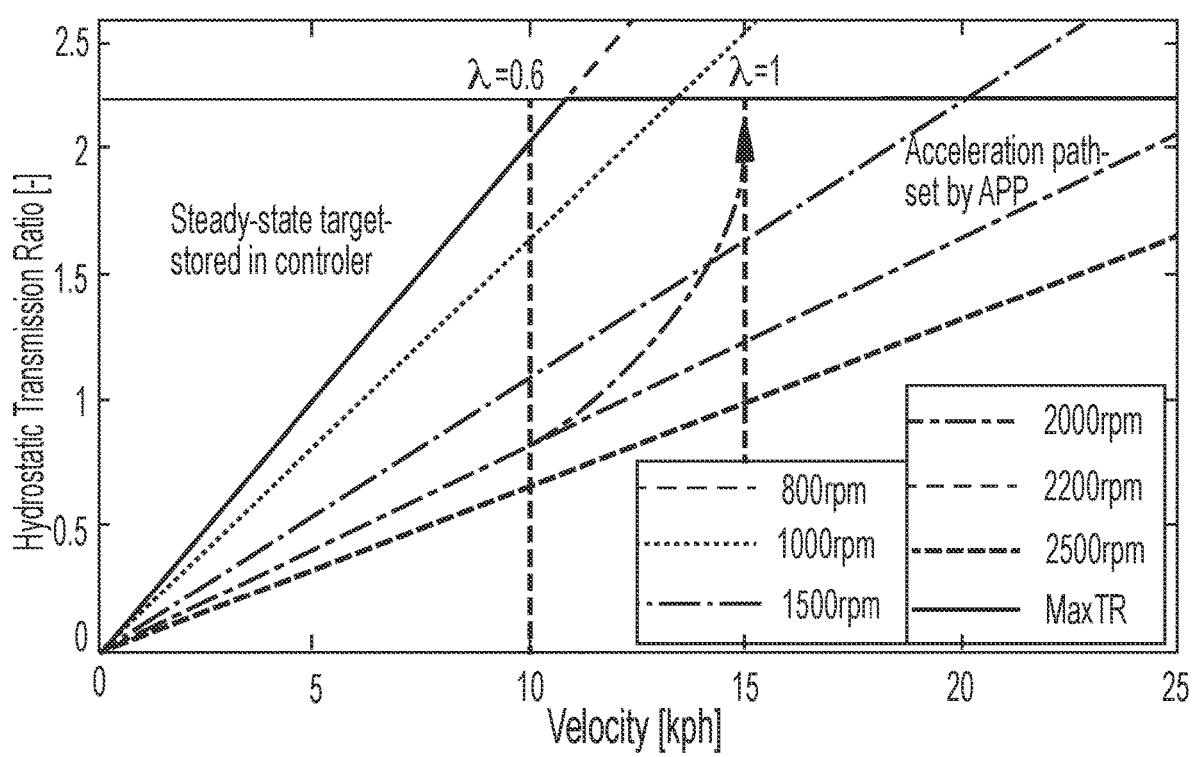
FIG. 22 illustrates a map for an example embodiment using a gain scheduled approach to increase transmission ratio as the forklift of FIG. 2 accelerates, according to various embodiments.

Sheet 16 of 20, in Fig. 22, Line 5, delete "controler" and insert --controller-- therefor.

Sheet 19 of 20, in Fig. 25, and on the title page, the illustrative figure, Term 2502, Line 2, delete "desirered" and insert --desired-- therefor.

Sheet 19 of 20, in Fig. 25, and on the title page, the illustrative figure, Term 2514, Line 4, delete "shaft ouput" and insert --shaft output-- therefor.

In the Specification

In Column 4, Line 44, delete "though" and insert --through--, therefor.

In the Claims

In Column 39, Claim 14, Line 36, delete "determine" and insert --determining-- therefor.

In Column 39, Claim 15, Line 49, delete "apparatus" and insert --system-- therefor.

In Column 39, Claim 16, Line 54, delete "apparatus" and insert --system-- therefor.

In Column 40, Claim 17, Line 21, delete "apparatus" and insert --system-- therefor.

In Column 40, Claim 18, Line 62, delete "apparatus" and insert --system-- therefor.

In Column 42, Claim 19, Line 5, delete "apparatus" and insert --system-- therefor.

Signed and Sealed this
Eighteenth Day of October, 2022

Katherine Kelly Vidal
*Director of the United States Patent and Trademark Office*